(12) United States Patent
Kim et al.

(10) Patent No.: US 11,763,807 B2
(45) Date of Patent: Sep. 19, 2023

(54) METHOD FOR RECOGNIZING VOICE AND ELECTRONIC DEVICE SUPPORTING THE SAME

(71) Applicant: Samsung Electronics Co., Ltd., Suwon-si (KR)

(72) Inventors: Soyoung Kim, Suwon-si (KR); Kyunghak Hyun, Suwon-si (KR); Sooyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 16/987,314

(22) Filed: Aug. 6, 2020

(65) Prior Publication Data

US 2021/0043209 A1 Feb. 11, 2021

(30) Foreign Application Priority Data

Aug. 6, 2019 (KR) ........................ 10-2019-0095777

(51) Int. Cl.
*G10L 15/08* (2006.01)
*G10L 15/22* (2006.01)

(52) U.S. Cl.
CPC ........ *G10L 15/22* (2013.01); *G10L 2015/221* (2013.01); *G10L 2015/223* (2013.01); *G10L 2015/228* (2013.01)

(58) Field of Classification Search
CPC .................................................. H04N 5/232
See application file for complete search history.

(56) References Cited

U.S. PATENT DOCUMENTS 9,143,603 B2 9/2015 Davis et al.
9,547,647 B2 1/2017 Badaskar
(Continued)

FOREIGN PATENT DOCUMENTS

JP 2010-224715 A2 10/2010
KR 10-2013-0073709 A 7/2013
(Continued)

OTHER PUBLICATIONS

International Search Report and Written Opinion of the International Searching Authority in connection with International Application No. PCT/KR2020/010340 dated Nov. 25, 2020, 9 pages.
(Continued)

*Primary Examiner* — Seong-Ah A Shin

(57) ABSTRACT

An electronic device is provided. The electronic device includes a microphone, a display, a camera, a processor, and a memory. The processor is configured to receive a first utterance input through the microphone. The processor is also configured to obtain first recognized data from a first image displayed on the display or stored in the memory. The processor is further configured to store the first recognized data in association with the first utterance input when the obtained first recognized data matches the first utterance input. Additionally, the processor is configured to activate the camera when the first recognized data does not match the first utterance input. The processor is also configured to obtain second recognized data from a second image collected through the camera and store the second recognized data in association with the first utterance input when the obtained second recognized data matches the first utterance input.

14 Claims, 14 Drawing Sheets

(56) References Cited

U.S. PATENT DOCUMENTS

| | | | |
|---|---|---|---|
| 9,609,117 | B2 | 3/2017 | Davis et al. |
| 9,916,864 | B2 | 3/2018 | An |
| 9,971,774 | B2 | 5/2018 | Badaskar |
| 10,347,296 | B2 | 7/2019 | An |
| 10,366,291 | B2 | 7/2019 | Nowak-Przygodzki et al. |
| 10,657,374 | B2 | 5/2020 | Nowak-Przygodzki et al. |
| 10,832,031 | B2 | 11/2020 | Kienzle et al. |
| 2011/0159921 | A1 | 6/2011 | Davis et al. |
| 2011/0165917 | A1 | 7/2011 | Taylor |
| 2013/0346068 | A1* | 12/2013 | Solem .................. G10L 15/26 704/9 |
| 2014/0081633 | A1 | 3/2014 | Badaskar |
| 2015/0088923 | A1* | 3/2015 | Garcia-Barrio ....... G06F 16/243 707/769 |
| 2016/0028878 | A1 | 1/2016 | Davis et al. |
| 2016/0104511 | A1 | 4/2016 | An |
| 2016/0110786 | A1* | 4/2016 | Herring .................. G01B 11/00 705/26.35 |
| 2016/0307561 | A1 | 10/2016 | Nanayakkara et al. |
| 2016/0378861 | A1* | 12/2016 | Eledath .................. G06V 20/52 707/766 |
| 2017/0161268 | A1 | 6/2017 | Badaskar |
| 2018/0046851 | A1 | 2/2018 | Kienzle et al. |
| 2018/0204602 | A1* | 7/2018 | An .......................... G10L 15/08 |
| 2018/0336414 | A1* | 11/2018 | Badr ...................... G06V 20/20 |
| 2019/0080168 | A1 | 3/2019 | Nowak-Przygodzki et al. |
| 2019/0080169 | A1* | 3/2019 | Nowak-Przygodzki ..................... G06Q 30/0281 |
| 2019/0172456 | A1 | 6/2019 | Lee |
| 2019/0325222 | A1 | 10/2019 | Nowak-Przygodzki et al. |
| 2020/0250433 | A1 | 8/2020 | Nowak-Przygodzki et al. |
| 2021/0064612 | A1* | 3/2021 | Huang ................ G06F 16/3329 |

FOREIGN PATENT DOCUMENTS

| | | |
|---|---|---|
| KR | 10-1696555 B1 | 2/2017 |
| KR | 10-2019-0066537 A | 6/2019 |
| WO | 2015042270 A1 | 3/2015 |

OTHER PUBLICATIONS

European Search Report dated Dec. 15, 2020 in connection with European Application No. 20189845.9, 8 pages.

* cited by examiner

FIG. 12

METHOD FOR RECOGNIZING VOICE AND ELECTRONIC DEVICE SUPPORTING THE SAME

CROSS-REFERENCE TO RELATED APPLICATION

This application is based on and claims priority under 35 U.S.C. § 119(a) to Korean Patent Application No. 10-2019-0095777 filed on Aug. 6, 2019 in the Korean Intellectual Property Office, the disclosure of which is incorporated by reference herein in its entirety.

BACKGROUND

1. Field

The present disclosure relates to a method for recognizing a voice of a user and an electronic device supporting the same.

2. Description of Related Art

Recent electronic devices may support various input methods such as voice input in addition to input methods using keyboards or mice. For example, electronic devices such as smartphones or tablets provide a voice recognition service for receiving a user's speech and executing an operation corresponding to the input user's speech.

Such a voice recognition service is being developed based on a technology of processing a natural language such as an everyday conversation of a user. According to the technology of processing a natural language, an intention of a user input (speech) is recognized, and a result corresponding to the recognized intention is calculated to provide a service to the user.

SUMMARY

An electronic device according to the related art separately provides a voice recognition service corresponding to an utterance input and a service (vision service) for analyzing an image to provide related information. In this case, the electronic device is unable to process an utterance input for performing a single task and an image input in association with each other, and thus may not provide an efficient artificial intelligence (AI) service desired by a user.

An electronic device according to an embodiment of the present disclosure may provide a voice recognition service for collectively processing a user utterance input and an image input in association with each other.

In accordance with an aspect of the present disclosure, an electronic device is provided. The electronic device includes a microphone, a display, a camera, a processor, and a memory operatively connected to the processor, wherein the memory stores instructions that cause, when executed, the processor to receive a first utterance input through the microphone, obtain first recognized data from a first image displayed on the display or stored in the memory, store the first recognized data in association with the first utterance input when the obtained first recognized data matches the first utterance input, activate the camera when the obtained first recognized data does not match the first utterance input, obtain second recognized data from a second image collected through the camera, and store the second recognized data in association with the first utterance input when the obtained second recognized data matches the first utterance input.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates a diagram of an example of a screen related to usage of recognized data stored in response to different utterance inputs according to various embodiments of the present disclosure.

DETAILED DESCRIPTION

Figure 1:
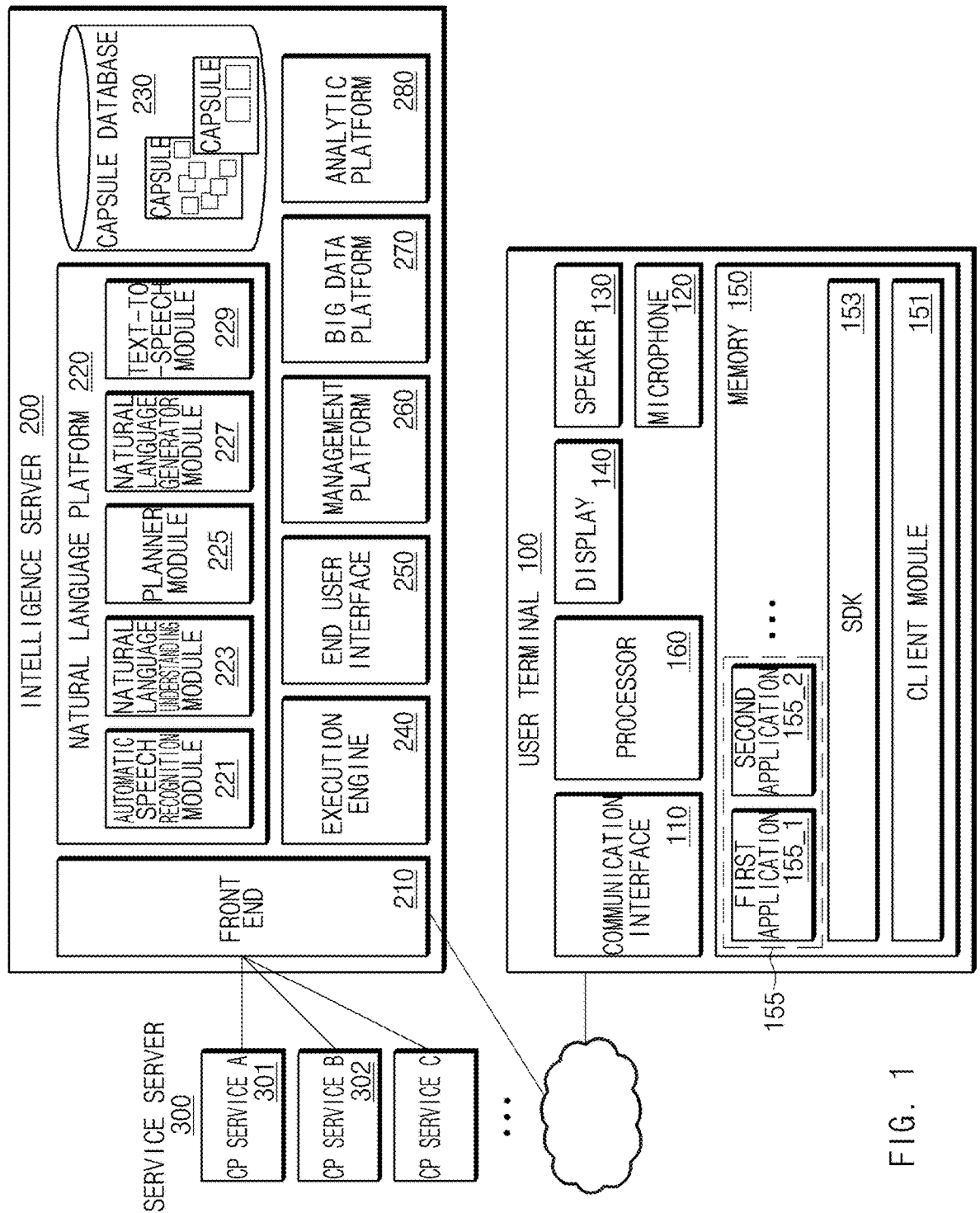
FIG. 1 illustrates a block diagram of an integrated intelligence system according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure will be described in detail with reference to the accompanying drawings. However, it should be understood that the present disclosure is not limited to specific embodiments, but rather includes various modifications, equivalents and/or alternatives of the embodiments of the present disclosure. Regarding description of the drawings, like reference numerals may refer to like elements.

FIG. 1 illustrates a block diagram of an integrated intelligence system according to an embodiment of the present disclosure.

Referring to FIG. 1, an integrated intelligence system according to an embodiment of the present disclosure may include a user terminal 100, an intelligence server 200, and a service server 300.

The user terminal 100 of an embodiment of the present disclosure may be a terminal device (or an electronic device) connectable to the Internet, such as a mobile phone, a smartphone, a personal digital assistant (PDA), a laptop computer, a TV, white goods, a wearable device, an HMD, or a smart speaker.

According to the illustrated embodiment, the user terminal 100 may include a communication interface 110, a microphone 120, a speaker 130, a display 140, a memory 150, or a processor 160. The above elements may be operatively or electrically connected to each other. According to an embodiment of the present disclosure, the user terminal 100 may further include a camera. The camera may obtain image data related to a surrounding object.

The communication interface 110 of an embodiment of the present disclosure may be connected to an external device to transmit/receive data. The microphone 120 of an embodiment of the present disclosure may receive a sound (e.g., a user speech) and may convert the sound into an electric signal. The speaker 130 of an embodiment of the present disclosure may output an electric signal as a sound (e.g., a voice). The display 140 of an embodiment of the present disclosure may be configured to display an image or video. The display 140 of an embodiment of the present disclosure may also display a graphic user interface (GUI) of an executed application (or an application program).

The memory 150 of an embodiment of the present disclosure may store a client module 151, a software development kit (SDK) 153, and a plurality of applications 155. The client module 151 and the SDK 153 may constitute a framework (or a solution program) for executing a general-purpose function. Furthermore, the client module 151 or the SDK 153 may constitute a framework for processing a voice input.

The plurality of applications 155 may be programs for executing a designated function. According to an embodiment of the present disclosure, the plurality of applications 155 may include a first application 155_1 and a second application 155_3. According to an embodiment of the present disclosure, each of the plurality of applications 155 may include a plurality of operations for executing a designated function. For example, the applications may include an alarm application, a message application, and/or a schedule application. According to an embodiment of the present disclosure, the plurality of applications 155 may be executed by the processor 160 to sequentially perform at least a portion of the plurality of operations.

The processor 160 of an embodiment of the present disclosure may control overall operation of the user terminal 100. For example, the processor 160 may be electrically connected to the communication interface 110, the microphone 120, the speaker 130, and the display 140 to perform a designated operation.

The processor 160 of an embodiment of the present disclosure may execute the programs stored in the memory 150 to execute a designated function. For example, the processor 160 may execute at least one of the client module 151 or the SDK 153 to perform the following operations for processing a voice input. The processor 160 may control operation of the plurality of applications 155 through, for example, the SDK 153. The following operations described as operations of the client module 151 or the SDK 153 may be performed by the processor 160.

The client module 151 of an embodiment of the present disclosure may receive a voice input. For example, the client module 151 may receive a voice input corresponding to a user speech detected through the microphone 120. The client module 151 may transmit the received voice input to the intelligence server 200. The client module 151 may transmit, to the intelligence server 200, state information about the user terminal 100 together with the received voice input. The state information may be, for example, execution state information about an application.

The client module 151 of an embodiment of the present disclosure may receive a result corresponding to the received voice input. For example, the client module 151 may receive the result corresponding to the received voice input when the intelligence server 200 is capable of calculating the result corresponding to the received voice input. The client module 151 may display the received result on the display 140.

The client module 151 of an embodiment of the present disclosure may receive a plan corresponding to the received voice input. The client module 151 may display, on the display 140, results of performing a plurality of operations of an application according to the plan. The client module 151, for example, may sequentially display the results of performing a plurality of operations on the display 140. For another example, the user terminal 100 may display, on the display 140, only a portion of the results (e.g., result of performing a last operation) of performing a plurality of operations.

According to an embodiment of the present disclosure, the client module 151 may receive, from the intelligence server 200, a request for obtaining information used for calculating a result corresponding to a voice input. According to an embodiment of the present disclosure, the client module 151 may transmit the information to the intelligence server 200 in response to the request.

The client module 151 of an embodiment of the present disclosure may transmit, to the intelligence server 200, result information about results of performing a plurality of operations according to the plan. The intelligence server 200 may confirm that the received voice input has been correctly performed, using the result information.

The client module 151 of an embodiment of the present disclosure may include a voice recognition module. According to an embodiment of the present disclosure, the client module 151 may recognize, through the voice recognition module, a voice input for executing a limited function. For example, the client module 151 may execute an intelligent application for processing a voice input for performing a systematic operation through a designated input (e.g., Wake up!).

The intelligence server 200 of an embodiment of the present disclosure may receive information related to a user voice input from the user terminal 100 via a communication network. According to an embodiment of the present disclosure, the intelligence server 200 may change data related to a received voice input into text data. According to an embodiment of the present disclosure, the intelligence server 200 may generate, based on the text data, a plan for performing a task corresponding to the user voice input.

According to an embodiment of the present disclosure, the plan may be generated by an artificial intelligence (AI) system. The artificial intelligence system may be a rule-based system or a neural network-based system (e.g., a feedforward neural network (FNN), a recurrent neural network (RNN)). Alternatively, the artificial intelligence system may be a combination of the foregoing systems or other artificial intelligence systems. According to an embodiment of the present disclosure, the plan may be selected from a set of predefined plans or may be generated in real time in response to a user request. For example, the artificial intelligence system may select at least one plan from among a plurality of predefined plans.

The intelligence server 200 of an embodiment of the present disclosure may transmit a result according to a generated plan to the user terminal 100, or may transmit the generated plan to the user terminal 100. According to an embodiment of the present disclosure, the user terminal 100 may display, on the display 140, a result according to a plan. According to an embodiment of the present disclosure, the user terminal 100 may display, on the display 140, a result of performing an operation according to a plan.

The intelligence server 200 of an embodiment of the present disclosure may include a front end 210, a natural language platform 220, a capsule database 230, an execution engine 240, an end user interface 250, a management platform 260, a big data platform 270, or an analytic platform 280.

The front end 210 of an embodiment of the present disclosure may receive a voice input from the user terminal 100. The front end 210 may transmit a response corresponding to the voice input.

According to an embodiment of the present disclosure, the natural language platform 220 may include an automatic speech recognition (ASR) module 221, a natural language understanding (NLU) module 223, a planner module 225, a natural language generator (NLG) module 227, or a text-to-speech (TTS) module 229.

The automatic speech recognition module 221 of an embodiment of the present disclosure may convert a voice input received from the user terminal 100 into text data. The natural language understanding module 223 of an embodiment of the present disclosure may recognize an intention of a user using the text data of the voice input. For example, the natural language understanding module 223 may recognize the intention of the user by performing syntactic analysis or semantic analysis. The natural language understanding module 223 of an embodiment of the present disclosure may recognize a meaning of a word extracted from a voice input using a linguistic feature (e.g., syntactic element) of a morpheme or phrase, and may match the recognized meaning to an intention to determine the intention of the user.

The planner module 225 of an embodiment of the present disclosure may generate a plan using the intention and parameter determined by the natural language understanding module 223. According to an embodiment of the present disclosure, the planner module 225 may determine a plurality of domains used for performing a task, based on the determined intention. The planner module 225 may determine a plurality of operations included in each of the plurality of domains determined based on the intention. According to an embodiment of the present disclosure, the planner module 225 may determine parameters used for performing the plurality of determined operations or result values output by performing the plurality of operations. The parameters and the result values may be defined as a concept of a designated form (or class). Accordingly, the plan may include a plurality of operations and a plurality of concepts determined according to the intention of the user. The planner module 225 may determine relationships between the plurality of operations and the plurality of concepts in stages (or hierarchically). For example, the planner module 225 may determine, based on the plurality of concepts, an execution order of the plurality of operations determined based on the intention of the user. In other words, the planner module 225 may determine the execution order of the plurality of operations based on the parameters used for performing the plurality of operations and results output by performing the plurality of operations. Accordingly, the planner module 225 may generate a plan including association information (e.g., ontology) between the plurality of operations and the plurality of concepts. The planner module 225 may generate a plan using information stored in the capsule database 230, which stores a set of relationships between concepts and operations.

The natural language generator module 227 of an embodiment of the present disclosure may change designated information into a text form. The information changed into a text form may have a form of a natural language utterance. The text-to-speech module 229 of an embodiment of the present disclosure may change text-form information into voice-form information.

According to an embodiment of the present disclosure, a portion or all of functions of the natural language platform 220 may be implementable in the user terminal 100.

The capsule database 230 may store information about relationships between a plurality of operations and concepts corresponding to a plurality of domains. According to an embodiment of the present disclosure, a capsule may include a plurality of action objects (or action information) and concept objects (or concept information). According to an embodiment of the present disclosure, the capsule database 230 may store a plurality of capsules in a form of a concept action network (CAN). According to an embodiment of the present disclosure, the plurality of capsules may be stored in a function registry included in the capsule database 230.

The capsule database 230 may include a strategy registry, which stores strategy information that is used when determining a plan corresponding to a voice input. The strategy information may include reference information for determining one plan when there are a plurality of plans corresponding to a voice input. According to an embodiment of the present disclosure, the capsule database 230 may include a follow-up registry, which stores follow-up operation information for suggesting a follow-up operation to the user in a designated situation. The follow-up operation may include, for example, a follow-up utterance. According to an embodiment of the present disclosure, the capsule database 230 may include a layout registry, which stores layout information about information output through the user terminal 100. According to an embodiment of the present disclosure, the capsule database 230 may include a vocabulary registry, which stores vocabulary information included in capsule information. According to an embodiment of the present disclosure, the capsule database 230 may include a dialog registry, which stores dialog information about a dialog (or interaction) with the user. The capsule database 230 may update a stored object through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for editing a follow-up utterance that activates a follow-up objective and provides a hint. The follow-up objective may be determined based on a currently set objective, user's preference, or environmental condition. In an embodiment of the present disclosure, the capsule database 230 may also be implementable in the user terminal 100.

The execution engine 240 of an embodiment of the present disclosure may calculate a result using the generated plan. The end user interface 250 may transmit the calculated result to the user terminal 100. Accordingly, the user terminal 100 may receive the result and may provide the received result to the user. The management platform 260 of an embodiment of the present disclosure may manage information used in the intelligence server 200. The big data platform 270 of an embodiment of the present disclosure may collect data of the user. The analytic platform 280 of an embodiment of the present disclosure may manage quality of service (QoS) of the intelligence server 200. For example, the analytic platform 280 may manage elements and a processing speed (or efficiency) of the intelligence server 200.

The service server 300 of an embodiment of the present disclosure may provide a designated service (e.g., food order or hotel reservation) to the user terminal 100. According to an embodiment of the present disclosure, the service server 300 may be a server operated by a third party. The service server 300 of an embodiment of the present disclosure may provide, to the intelligence server 200, information for generating a plan corresponding to a received voice input. The provided information may be stored in the capsule database 230. Furthermore, the service server 300 may provide result information according to a plan to the intelligence server 200.

In the above-described integrated intelligence system, the user terminal 100 may provide various intelligent services to the user in response to a user input. The user input may include, for example, an input via a physical button, a touch input, or a voice input.

In an embodiment of the present disclosure, the user terminal 100 may provide a voice recognition service through an intelligent application (or a voice recognition application) stored in the user terminal 100. In this case, for example, the user terminal 100 may recognize a user utterance or voice input received through the microphone, and may provide a service corresponding to a recognized voice input to the user.

In an embodiment of the present disclosure, the user terminal 100 may perform, based on a received voice input, a designated operation alone or in combination with the intelligence server and/or service server. For example, the user terminal 100 may execute an application corresponding to the received voice input, and may perform the designated operation through the executed application.

In an embodiment of the present disclosure, when the user terminal 100 provides a service in combination with the intelligence server 200 and/or the service server 300, the user terminal 100 may detect a user utterance using the microphone 120, and may generate a signal (or voice data) corresponding to the detected user utterance. The user terminal 100 may transmit the voice data to the intelligence server 200 using the communication interface 110.

The intelligence server 200 according to an embodiment of the present disclosure may generate, as a response to a voice input received from the user terminal 100, a plan for performing a task corresponding to the voice input or a result of performing an operation according to the plan. The plan may include, for example, a plurality of operations for performing a task corresponding to a user voice input and a plurality of concepts related to the plurality of operations. The concepts may be definitions of parameters input for performing the plurality of operations or result values output by performing the plurality of operations. The plan may include association information between the plurality of operations and the plurality of concepts.

The user terminal 100 of an embodiment of the present disclosure may receive the response using the communication interface 110. The user terminal 100 may output a voice signal generated in the user terminal 100 to the outside using the speaker 130, or may output an image generated in the user terminal 100 to the outside using the display 140.

Figure 2:
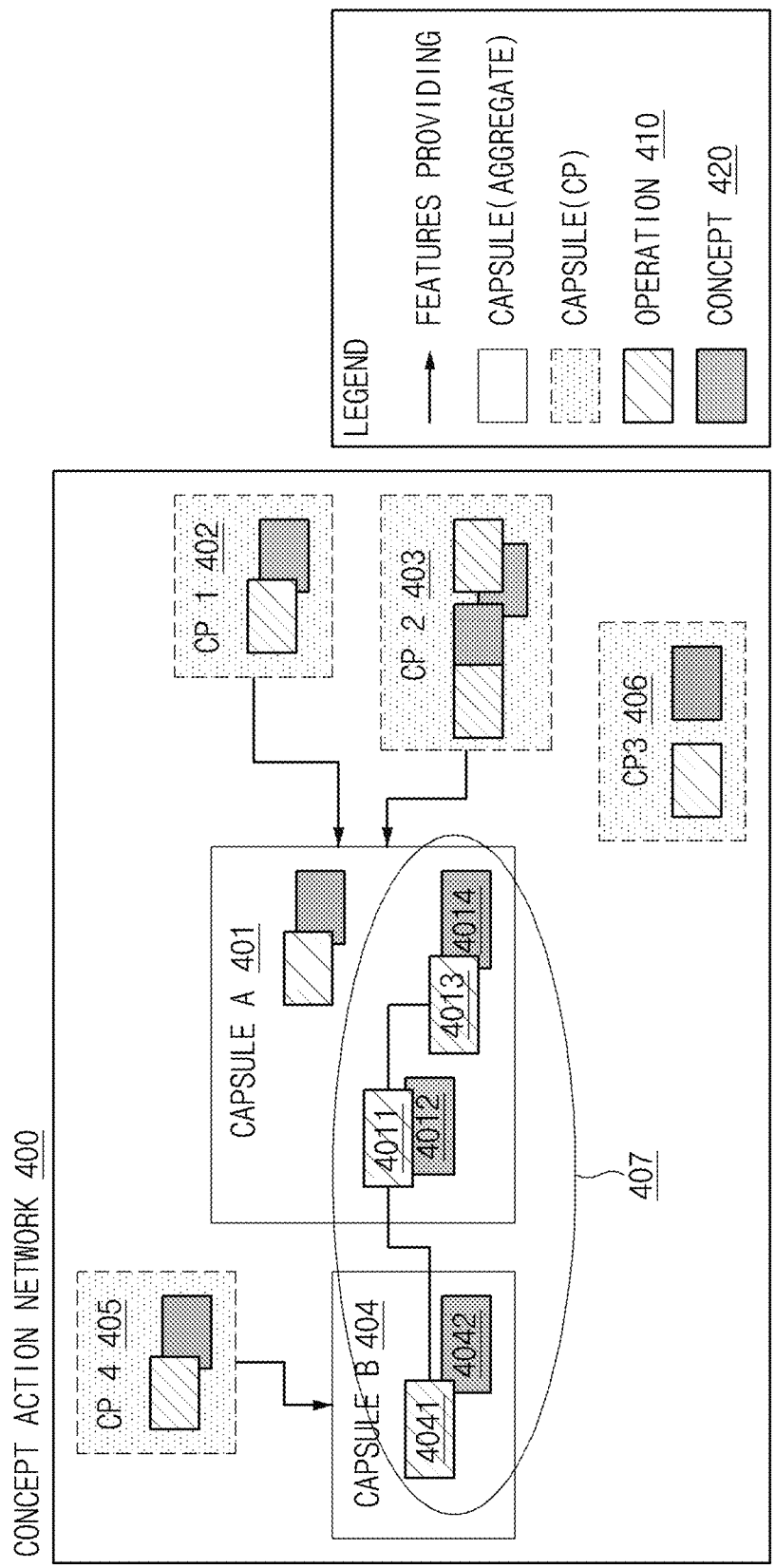
FIG. 2 illustrates a diagram of a form in which relationship information between a concept and an action is stored in a database according to an embodiment of the present disclosure.

FIG. 2 illustrates a diagram of a form in which relationship information between a concept and an operation is stored in a database according to various embodiments of the present disclosure.

The capsule database (e.g., capsule database 230) of the intelligence server 200 may store capsules in a form of a CAN 400. The capsule database may store an operation for performing a task corresponding to a user voice input and a parameter used for the operation in a form of a CAN.

The capsule database may store a plurality of capsules A 401 and B 404 corresponding to a plurality of domains (e.g., applications) respectively. According to an embodiment of the present disclosure, a single capsule (e.g., capsule A 401) may correspond to a single domain (e.g., location (geo), application). Furthermore, at least one service provider (e.g., CP 1 402 or CP 2 403) for executing a function for a domain related to one capsule may correspond to the one capsule. According to an embodiment of the present disclosure, a single capsule may include at least one operation 410 and at least one concept 420 for executing a designated function.

The natural language platform 220 may generate a plan for performing a task corresponding to a received voice input using a capsule included in the capsule database. For example, the planner module 225 of the natural language platform 220 may generate a plan using a capsule stored in the capsule database. For example, the planner module 225 may generate a plan 407 using operations 4011 and 4013 and concepts 4012 and 4014 of the capsule A 410 and an operation 4041 and concept 4042 of the capsule B 404.

Figure 3:
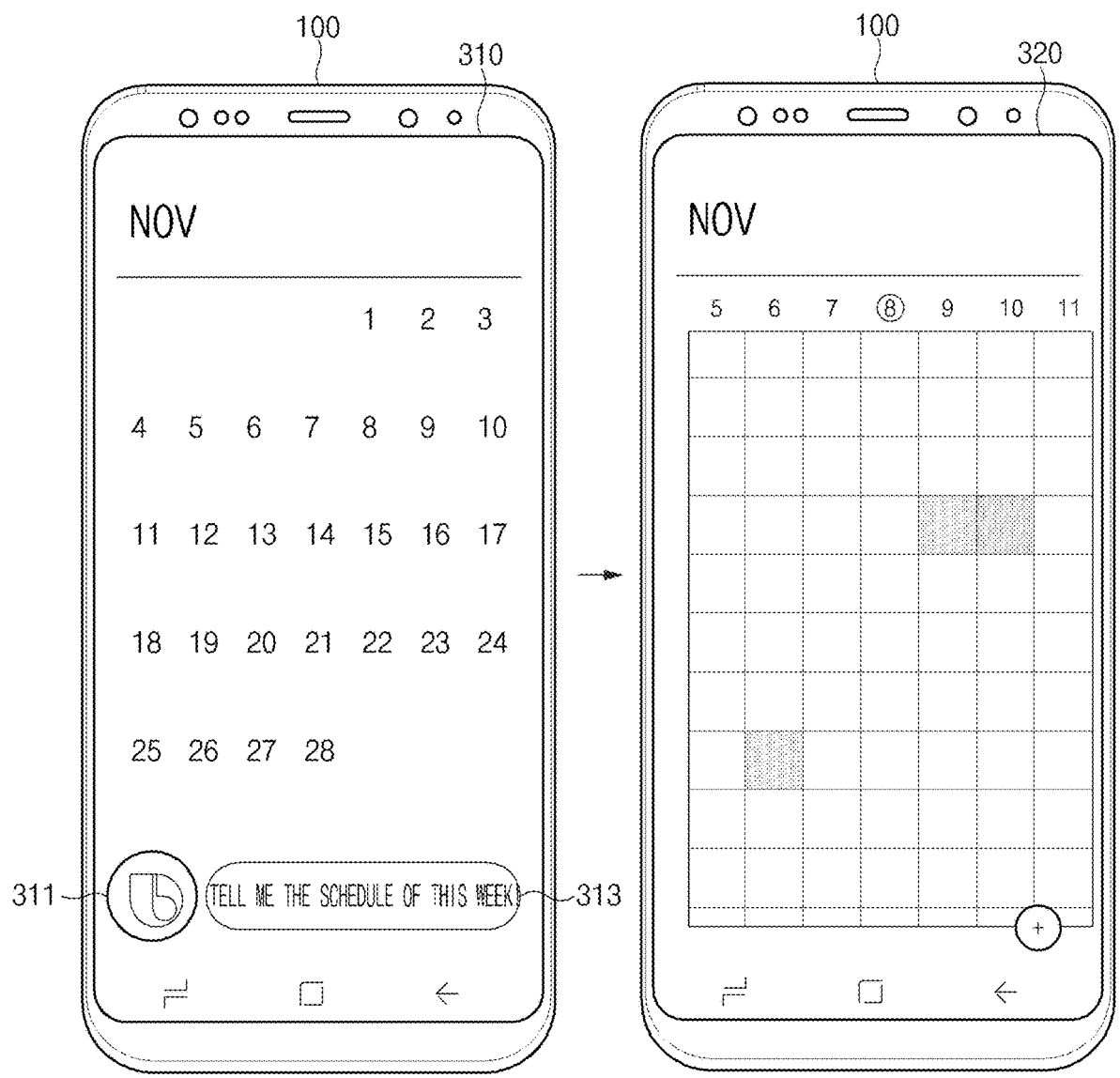
FIG. 3 illustrates a user terminal which displays a screen in which a received voice input is processed through a first application (e.g., intelligent application) according to an embodiment of the present disclosure.

FIG. 3 illustrates a diagram of a screen in which a voice input received through an intelligent application is processed by a user terminal according to various embodiments of the present disclosure.

The user terminal 100 may execute an intelligent application for processing a user input through the intelligence server 200.

According to an embodiment of the present disclosure, in a screen 310, when the user terminal 100 has recognized a designated voice input (e.g., Wake up!) or has received an input via a hardware key (e.g., dedicated hardware key), the user terminal 100 may execute an intelligent application for processing a voice input. The user terminal 100, for example, may execute an intelligent application in a state in which a schedule application has been executed. According to an embodiment of the present disclosure, the user terminal 100 may display, on the display 140, an object (e.g., icon) 311 corresponding to an intelligent application. According to an embodiment of the present disclosure, the user terminal 100 may receive a voice input caused by a user utterance. For example, the user terminal 100 may receive a voice input "Tell me the schedule of this week!". According to an embodiment of the present disclosure, the user terminal 100 may display, on the display, a user interface (UI) 313 (e.g., input window) of an intelligent application on which text data of the received voice input is displayed.

According to an embodiment of the present disclosure, in a screen 320, the user terminal 100 may display, on the display, a result corresponding to the received voice input. For example, the user terminal 100 may receive a plan corresponding to a received user input, and may display "schedule of this week" on the display according to the plan.

Figure 4:
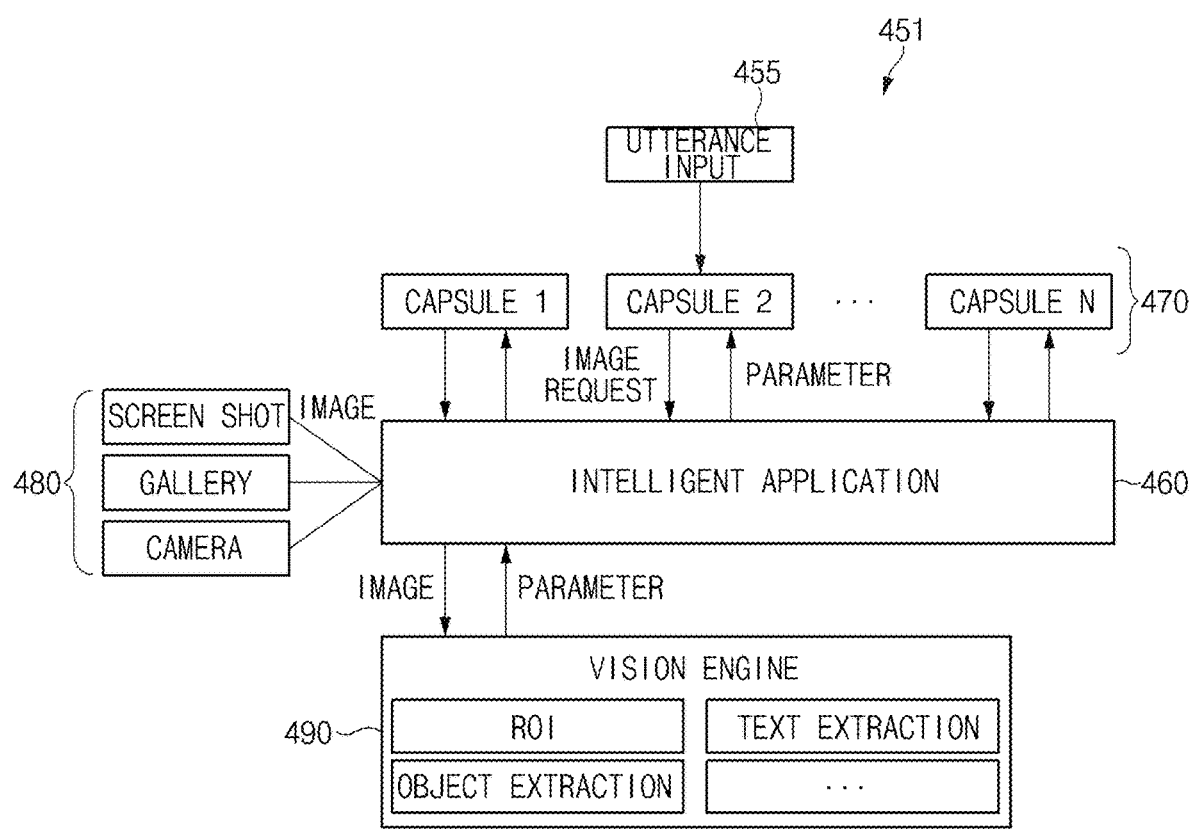
FIG. 4 illustrates a configuration diagram of an application program for processing an utterance input and image input according to various embodiments of the present disclosure.

FIG. 4 illustrates is a configuration diagram of an application program for processing an utterance input and image input according to various embodiments of the present disclosure. The illustration of FIG. 4 is merely an example, and embodiments of the present disclosure are not limited thereto.

Referring to FIG. 4, an application program 451 may include a first application 460 (e.g., intelligent application), a plurality of capsules 470, an image providing application 480, and a vision engine 490.

According to an embodiment of the present disclosure, the first application 460 (e.g., intelligent application) may process an utterance input 455 of the user and the image providing application 480 in association with each other. When a target or object in the utterance input 455 is not determined, the first application 460 (e.g., intelligent application) may analyze an image provided through the image providing application 480 to determine the target or object to perform a task corresponding to the utterance input 455. For example, when the user generates the utterance input 455 by speaking the wording "this" or "here" with respect to an image (actual target of a real world through a target included in a mobile screen or a screen captured through a camera) that is currently being viewed by the user, the first application 460 (e.g., intelligent application) may map a core keyword to the target recognized by analyzing the image (see FIGS. 5 to 12).

According to an embodiment of the present disclosure, the first application 460 (e.g., intelligent application) may process the utterance input 455 through a capsule corresponding to the utterance input 455 among the plurality of capsules 470. According to an embodiment of the present disclosure, the utterance input 455 of the user may be transmitted to an external server (e.g., the intelligence server 200 of FIG. 1) so as to be analyzed. According to an embodiment of the present disclosure, the utterance input 455 of the user may be transmitted to a surrounding electronic device (e.g., IoT device) so as to be analyzed. According to an embodiment of the present disclosure, the utterance input 455 of the user may be analyzed by a separate voice analysis module or system in an electronic device.

According to an embodiment of the present disclosure, when a parameter in the utterance input 455 of the user is not determined, the plurality of capsules 470 may transmit, to the first application 460 (e.g., intelligent application), a signal (e.g., visual prompt) for executing a process in association with an image input (or vision input). According to an embodiment of the present disclosure, the parameter may include data that is determined in order to recognize an intention, act, or command of the user among input data included in the utterance input 455. For example, the parameter may represent an additional word for extracting, from a voice input from the user, a word and recognizing an intention, act, or command of the user from the word.

According to an embodiment of the present disclosure, the first application 460 (e.g., intelligent application) may receive an image from the image providing application 480 in response to the signal. For example, the image may include a screen shot image, a preview image or captured image through a camera, and an image prestored in a memory.

According to an embodiment of the present disclosure, the first application 460 (e.g., intelligent application) may analyze an image through the vision engine 490. The vision engine 490 may recognize a text or object included in an image or may analyze a region of interest (ROI). The first application 460 (e.g., intelligent application) may transfer, to a capsule, data (hereinafter referred to as recognized data) recognized through the vision engine 490. The capsule may provide the recognized data to the user or may provide, to the user, a result of processing the recognized data automatically or based on an additional input from the user.

Figure 5A:
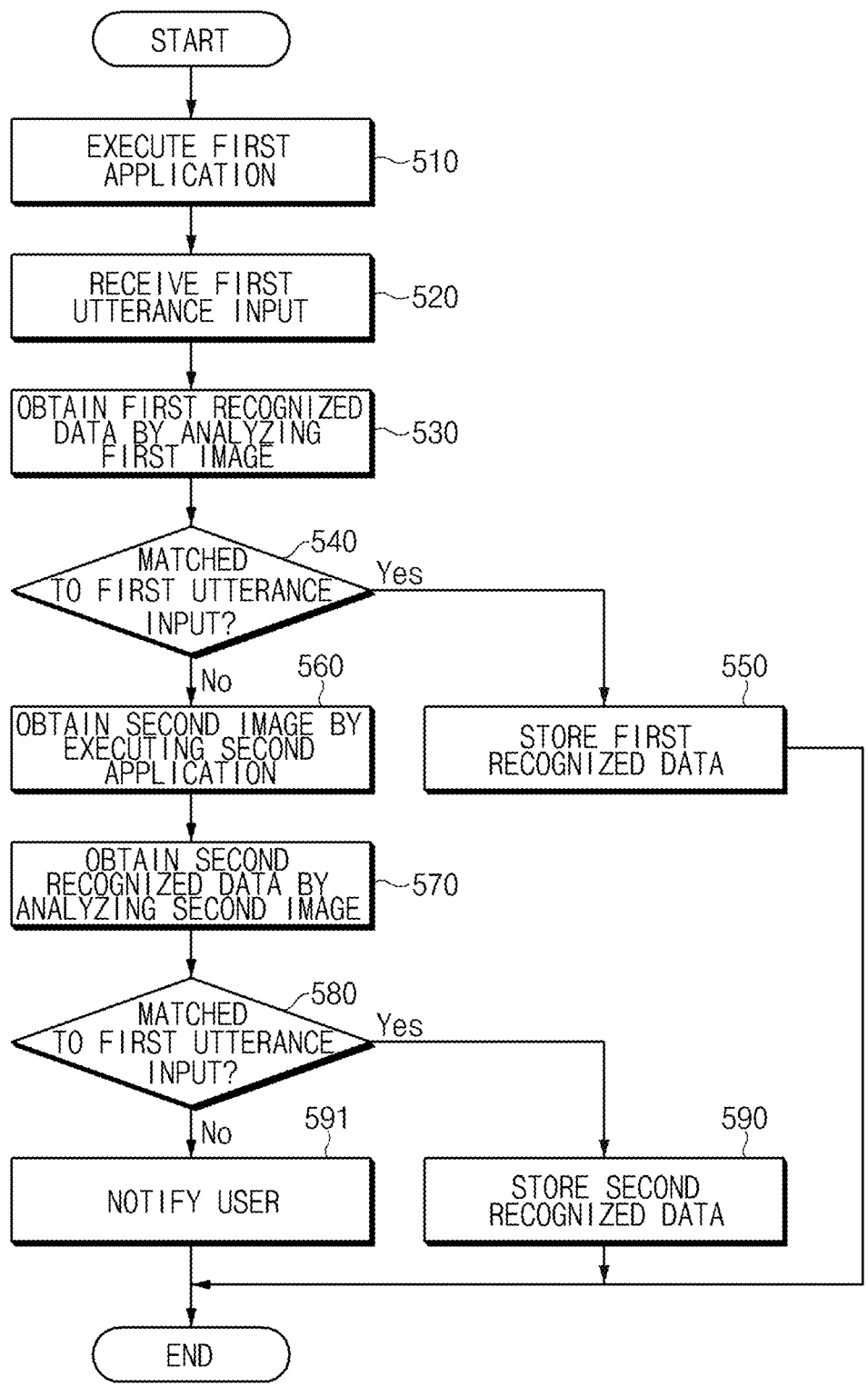
FIG. 5A illustrates a flowchart of a voice recognition method according to an embodiment of the present disclosure.

FIG. 5A illustrates a flowchart of a voice recognition method according to an embodiment of the present disclosure.

Referring to FIG. 5A, in operation 510, an electronic device (e.g., the processor 160 of FIG. 1) may execute a first application (e.g., an intelligent application or voice recognition application). In an embodiment of the present disclosure, the first application may be executed by various conditions. For example, the first application may be started by a startup utterance (e.g., "Wake up!" or "Hi, Bixby") in a user's utterance. For example, the first application may be executed by a user input (e.g., a touch input or hardware key input). For example, the first application (e.g., intelligent application) may be started according to a location of the user, a designated time, or a request of another application. The processor 160 may display a user interface related to the first application (e.g., intelligent application). When the first application (e.g., intelligent application) is executed, the processor 160 may wait to receive a user's utterance input.

According to an embodiment of the present disclosure, an electronic device (e.g., the processor 160) may execute the first application (e.g., intelligent application) based on an image obtained by the electronic device. For example, when an image is captured by using a camera, the processor 160 may analyze the captured image. When the captured image corresponds to a specific situation, the processor 160 may execute the first application (e.g., intelligent application) to start a dialog with the user.

For example, when the captured image includes a zone number of a parking lot, the processor 160 may execute the first application (e.g., intelligent application), and may output or display, to the user, a voice or text of "Do you want to store the image as parking lot information?".

For another example, when the captured image includes a human face, the processor 160 may execute the first application, and may output a voice of "Do you want to store the image as a passport photo" to the user via the speaker 130.

In operation 520, when the first application (e.g., intelligent application) is executed, the processor 160 may receive a first utterance input of the user via the microphone 120. The processor 160 may analyze the received first utterance input. According to an embodiment of the present disclosure, operation 510 of executing the first application (e.g., intelligent application) and operation 520 of receiving the first utterance input may be concurrently performed. For example, while waiting for a user's utterance to execute the first application (e.g., intelligent application), the electronic device may detect a specific startup utterance in the user's utterance, may analyze a user's utterance included after the startup utterance, and may determine a portion of the user's utterance as the first utterance input.

In an embodiment of the present disclosure, the processor 160 may transmit the first utterance input to the external intelligence server 200 to request to analyze the first utterance input. In another embodiment of the present disclosure, the processor 160 may analyze the first utterance input by performing calculation or data processing or using an analysis system in the electronic device. In another embodiment of the present disclosure, the processor 160 may analyze a portion of the first utterance input through an internal calculation, and may request the intelligence server 200 to analyze another portion of the first utterance input.

According to an embodiment of the present disclosure, the first utterance input may be an utterance in which a parameter for performing a task is expressed as (replaced with) a designated keyword. The parameter may be data that is determined in order to recognize an intention, act, or command of the user among input data included in the first utterance input. The keyword may include a demonstrative pronoun such as "this", "this place", "this person", or "this thing" or a term that does not specify a target. For example, when the first utterance input reads "Store this as a parking location", the keyword may be "this", and a parameter corresponding to the keyword "this" may be "J4, first basement level" determined through image analysis.

According to another embodiment of the present disclosure, the first utterance input may be an utterance that does not include a target for performing a task. For example, the first utterance input may read "Store" or "Store as a parking location".

In operation 530, the processor 160 may obtain first recognized data (or a first recognized object) by analyzing a first image. According to an embodiment of the present disclosure, the first recognized data may be a text, icon, or object information having a preset format. According to an embodiment of the present disclosure, the processor 160 may perform image analysis on the first image, and may extract, as the first recognized data, object information included in the first image according to a result of performing the image analysis. For example, the processor 160 may perform the image analysis on the first image through an object recognition algorithm, and may obtain, as the first recognized data, information about an object included in the first image. According to an embodiment of the present disclosure, the processor 160 may extract, as the first recognized data, a text included in the first image.

According to an embodiment of the present disclosure, the processor 160 may generate a plurality of pieces of data using the first image, and may remove unnecessary data through primary filtering. For example, the processor 160 may generate a plurality of pieces of data using the first image, and may obtain the first recognized data from among the plurality of pieces of data through an additional algorithm. For example, when there are multiple objects obtained using the first image, the processor 160 may select, as the first recognized data, an object selected from among the multiple objects based on situation information. For example, when objects extracted from the first image include a parking lot, a vehicle, a person, or a parking lot floor level, the processor 160 may determine parking lot floor level information as the first recognized data through an additional algorithm for selecting a plurality of objects. According to an embodiment of the present disclosure, the first recognized data may include a plurality of objects. The processor 160 may obtain all of the plurality of objects as the first recognized data through the first image.

According to an embodiment of the present disclosure, a format of the first recognized data may be defined as various forms according to a domain processed by the first application (e.g., intelligent application). The processor 160 may obtain the first recognized data by analyzing the first image by performing an internal calculation or using an external server (e.g., the intelligence server 200 or an additional server for analyzing an image).

According to an embodiment of the present disclosure, the first image may be an image included in content displayed on the display. For example, the processor 160 may store, as images, pieces of contents displayed on the display. For example, when the first application (e.g., intelligent application) is executed, the processor 160 may store, as the first image, a screen shot of an execution screen of a recently executed application. For another example, regardless of whether the first application (e.g., intelligent application) is executed, the processor 160 may store, as the first image, a screen shot of an execution screen of a recently executed application. For another example, when receiving the first utterance input, the processor 160 may store, as the first image, a screen shot of content displayed on the display. According to an embodiment of the present disclosure, the first image may include information stored as an image for pieces of content provided through the electronic device. For example, when the user is viewing an image through an image application, the electronic device may store, as the first image, image content in the executed image application. According to an embodiment of the present disclosure, the electronic device may combine and store a plurality of images as one first image. For example, when the user is simultaneously using the image application and a web browser, screens of content (e.g., image, web screen) used in each of the applications may be extracted and combined as one first image.

According to an embodiment of the present disclosure, the processor 160 may obtain the first image from an application according to situation information about the electronic device. For example, the situation information may include location information, time information, schedule information, or pieces of preset information of the user. For example, when the location information about the electronic device is determined as a parking lot, the processor 160 may store, as the first image, a screen of an application related to the parking lot. For example, when the schedule information of the user indicates a state in which the user is attending a meeting, the processor 160 may store, as the first image, a screen displayed by an office program (e.g., PowerPoint, Excel, or Word processor) of various applications of the electronic device.

According to an embodiment of the present disclosure, the processor 160 may confirm the first image in a recently executed application. For example, the processor 160 may determine, as the first image, a recently enlarged and displayed image in a gallery application.

According to an embodiment of the present disclosure, the type of the first recognized data may be determined as a designated type according to a domain of the first utterance input. For example, when the domain of the first utterance input is "storing a parking place", the type of the first recognized data may be determined as a combination of a character and a number. For example, according to an utterance input "parking place", "14th floor, zone B" which is information indicating the location of a parking lot in the first image may be obtained as the first recognized data.

In operation 540, the processor 160 may confirm whether the obtained first recognized data matches the first utterance input. According to an embodiment of the present disclosure, a matching operation may include an operation of confirming, by the processor 160, whether an attribute of the first recognized data matches the domain of the first utterance input.

For example, when the attribute of the extracted first recognized data is a combination of a character and a number, and the domain of the first utterance input is "storing a parking place", the processor 160 may determine that the extracted first recognized data matches the first utterance input.

For example, when the attribute of the extracted first recognized data is a combination of a number and a sign, and the domain of the first utterance input is "processing of passport information", the processor 160 may determine that the extracted first recognized data matches the first utterance input.

According to an embodiment of the present disclosure, operation 540 of matching with the first utterance input is not limited to an operation of confirming based on the attribute of the first recognized data. For example, the processor 160 may recognize a meaning of the first utterance input, and may determine that the first recognized data matches the first utterance input when the meaning of the first utterance input is determined to be associated with the first recognized data.

According to various embodiments of the present disclosure, operation 530 and operation 540 may be combined. For example, the processor 160 may obtain, from data obtained by analyzing the first image, the first recognized data that matches the first utterance input.

In operation 550, when the extracted first recognized data matches the first utterance input, the processor 160 may store the extracted first recognized data in association with the first utterance input. The processor 160 may store the first recognized data or first image by tagging the first recognized data or first image with a keyword of the first utterance input. For example, during an operation of tagging and storing, the processor 160 may generate a keyword corresponding to the first utterance input, and may store the first recognized data with the generated keyword as a tagged value. According to an embodiment of the present disclosure, the electronic device may store the tagged keyword and the first recognized data in a form of a database, and may store the same so that the electronic device may obtain or use the first recognized data based on tagging information. When storing the first image by tagging the first image, the electronic device may store the first image together with keyword information by mapping the first image and the keyword information, and may search for or use the first image based on the tagging information.

According to an embodiment of the present disclosure, when storing an obtained image or first recognized data, the processor 160 may further determine whether the obtained image or first recognized data is information related to personal information about the user or information that should be secured (hereinafter referred to as sensitive information). When the first recognized data is sensitive information (e.g., personal information, security information, or important information), the processor 160 may store the first recognized data in a separate memory area (e.g., security area) having enhanced security. For example, when an image is determined as information which should be secured or information for which preset security is used to be enhanced, the processor 160 may store the first recognized data in a security-enhanced memory area (e.g., trust zone) rather than a normal memory area. According to an embodiment of the present disclosure, when an image includes sensitive information, the processor 160 may store the first recognized data in an access-restricted separate security folder.

According to an embodiment of the present disclosure, the processor 160 may perform a task corresponding to the first utterance input using the first recognized data as an essential parameter of the first utterance input. For example, when the first utterance input reads "store parking lot information", a task corresponding to the first utterance input is a task of obtaining parking lot information and storing the obtained information. To perform the task corresponding to the first utterance input, the processor 160 may confirm whether the first recognized data obtained from the first image is parking lot information corresponding to the first utterance input. When the first recognized data is parking lot information, the processor 160 may store the first recognized data as parking lot information.

According to an embodiment of the present disclosure, the processor 160 may display the extracted first recognized data through a user interface of the first application (e.g., intelligent application). The processor 160 may allow the user to confirm or change the first recognized data obtained through the user interface of the first application (e.g., intelligent application).

According to an embodiment of the present disclosure, the processor 160 may provide the first recognized data to another application, and may support so that an operation associated with the first recognized data is performed through the other application.

According to an embodiment of the present disclosure, the processor 160 may provide the first recognized data to a surrounding electronic device so as to perform an operation associated with the first recognized data together with the surrounding electronic device.

According to various embodiments of the present disclosure, when a second utterance input requests processing of stored first recognized data, the processor 160 may perform a task for the second utterance input using the stored first recognized data. For example, when the second utterance input which reads "tell me the parking place" is received in a state in which the first recognized data is stored as "J1, fourth basement level" in response to the first utterance input which reads "store the parking place", the processor 160 may display, on the display, "J1, fourth basement level" which is the first recognized data.

According to various embodiments of the present disclosure, the processor 160 may store the first recognized data in association with the first application (e.g., intelligent application). Alternatively, the processor 160 may provide the first recognized data to an application associated with the first recognized data. The processor 160 may store the first recognized data in a storage format that is usable in an associated application. For example, when the first recognized data is a parking location, the processor 160 may provide the first recognized data to a reminder application. For example, the processor 160 may store the first recognized data so that the first recognized data may be used in the reminder application.

In operation 560, when the extracted first recognized data does not match the first utterance input, the processor 160 may obtain a second image by executing a second application (e.g., camera application). For example, the processor 160 may obtain the second image using a camera application. For example, when the first image does not include information corresponding to the first utterance input, the second image may be obtained by further executing the camera application.

According to an embodiment of the present disclosure, when the first image does not include information corresponding to the first utterance input, the processor 160 may obtain the second recognized data through the second image obtained using an external camera of an electronic device as the second application or an external electronic device or server. For example, the processor 160 may obtain location information about an electronic device as the second application and the second image through a map application based on the location information.

According to an embodiment of the present disclosure, the second image may be a preview image collected through a camera. The processor 160 may obtain the second recognized data by analyzing the preview image in real time.

According to an embodiment of the present disclosure, the second image may be an image captured automatically or in response to a user input.

According to an embodiment of the present disclosure, the second application may include a web browser application. The processor 160 may obtain the second image related to a user utterance from the web browser application.

According to an embodiment of the present disclosure, the processor 160 may determine, as the second image, an image obtained through various sensors (e.g., an infrared sensor, an optical sensor, a depth sensor, a position sensor, a GPS sensor, or a biometric sensor) of an electronic device.

In operation 570, the processor 160 may extract the second recognized data by analyzing the second image obtained through the second application (e.g., camera application). The type of the second recognized data may be a text, icon, or object information. According to an embodiment of the present disclosure, a format of the second recognized data may be defined as various forms according to a domain processed by the first application (e.g., intelligent application). The processor 160 may obtain the second recognized data by analyzing the second image by performing an internal calculation or using an external server (e.g., the intelligence server 200 or an additional server for analyzing an image).

In operation 580, the processor 160 may confirm whether the extracted second recognized data matches the first utterance input. According to an embodiment of the present disclosure, the processor 160 may confirm whether an attribute of the second recognized data matches the domain of the first utterance input. According to an embodiment of the present disclosure, an operation of matching with the first utterance input is not limited to an operation of confirming the attribute of the second recognized data. For example, the processor 160 may recognize a meaning of the first utterance input, and may determine that the second recognized data matches the first utterance input when the meaning of the first utterance input is determined to be associated with the second recognized data.

According to various embodiments of the present disclosure, operation 570 and operation 550 may be combined. For example, the processor 160 may obtain, from data obtained by analyzing the second image, the second recognized data that matches the first utterance input.

In operation 590, when the extracted second recognized data matches the first utterance input, the electronic device (e.g., the processor 160) may store the extracted second recognized data in association with the first utterance input. The processor 160 may store the second recognized data or second image by tagging the second recognized data or second image with a keyword of the first utterance input.

In operation 591, when the extracted second recognized data does not match the first utterance input, the processor 160 may give an alarm to the user. For example, the alarm may be a message notifying absence of data recognized through a camera.

Figure 5B:
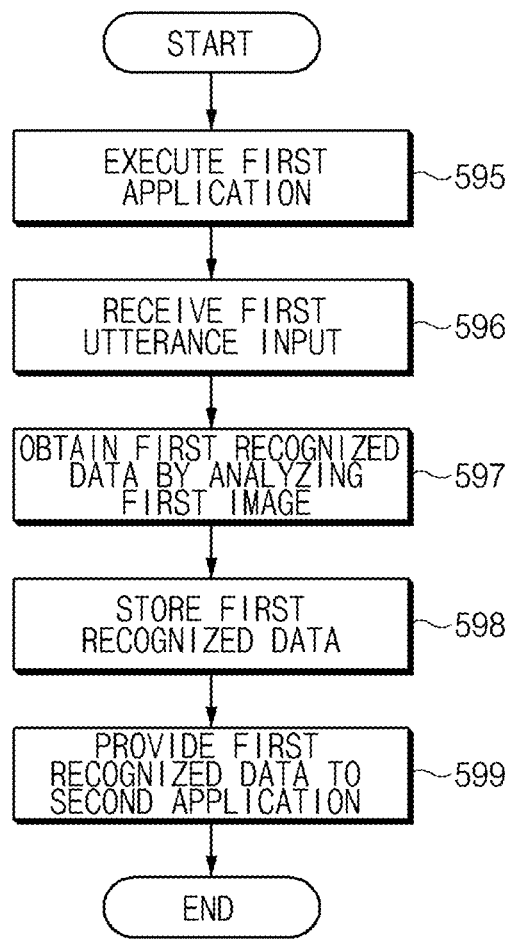
FIG. 5B illustrates a flowchart of a voice recognition method according to another embodiment of the present disclosure.

FIG. 5B illustrates a flowchart of a voice recognition method according to another embodiment of the present disclosure.

Referring to FIG. 5B, in operation 595, an electronic device (e.g., the processor 160 of FIG. 1) may execute a first application (e.g., an intelligent application or voice recognition application).

In operation 596, the processor 160 may receive a first utterance input. The processor 160 may analyze the first utterance input. In an embodiment of the present disclosure, the processor 160 may transmit the first utterance input to the external intelligence server 200 to request to analyze the first utterance input.

According to an embodiment of the present disclosure, the first utterance input may be an utterance in which a parameter for performing a task is expressed as (replaced with) a designated keyword (e.g., "this", "this place", "this person", or "this thing").

In operation 597, the processor 160 may obtain first recognized data associated with the first utterance input from a first image provided through the first application.

According to an embodiment of the present disclosure, the first application may be a recently executed application or an application which has been executed before. The processor 160 may obtain the first recognized data associated with the first utterance input by analyzing the first image (e.g., screen shot) provided from the first application.

According to another embodiment of the present disclosure, the first application may be a camera application. The processor 160 may obtain the first recognized data associated with the first utterance input by analyzing the first image (e.g., a preview image or captured image) through a camera application.

In operation 598, the processor 160 may store the obtained first recognized data in association with the first utterance input. The processor 160 may store the first recognized data or first image by tagging the first recognized data or first image with a keyword of the first utterance input. For example, during an operation of tagging and storing, the processor 160 may generate a keyword corresponding to the first utterance input, and may store the first recognized data with the generated keyword as a tagged value.

In operation 599, the processor 160 may provide the first recognized data so that the first recognized data may be used through a second application. The processor 160 may provide the first recognized data to an application associated with the first recognized data or the first utterance input. For example, when the first recognized data is a parking location, the processor 160 may provide the first recognized data to a reminder application.

According to various embodiments of the present disclosure, the processor 160 may extract the first recognized data by analyzing screen information about an application. The processor 160 may notify the user of processing of the first recognized data based on a format or attribute of the first recognized data. For example, when parking lot information is recognized from a screen, the processor 160 may output or display a sound or text of "do you want to store as parking lot information?". When an additional input from the user occurs, the processor 160 may store the first recognized data so that the first recognized data may be used through a second application.

According to various embodiments of the present disclosure, when recognized data related to personal information about the user is obtained, the processor 160 may notify the user that the recognized data may be stored in a separate security folder, or may automatically store the recognized data in a security folder. For example, when a passport image or passport information is recognized through an image, the processor 160 may store the passport image or passport information in a security folder that may be checked through additional authentication.

Figure 6:
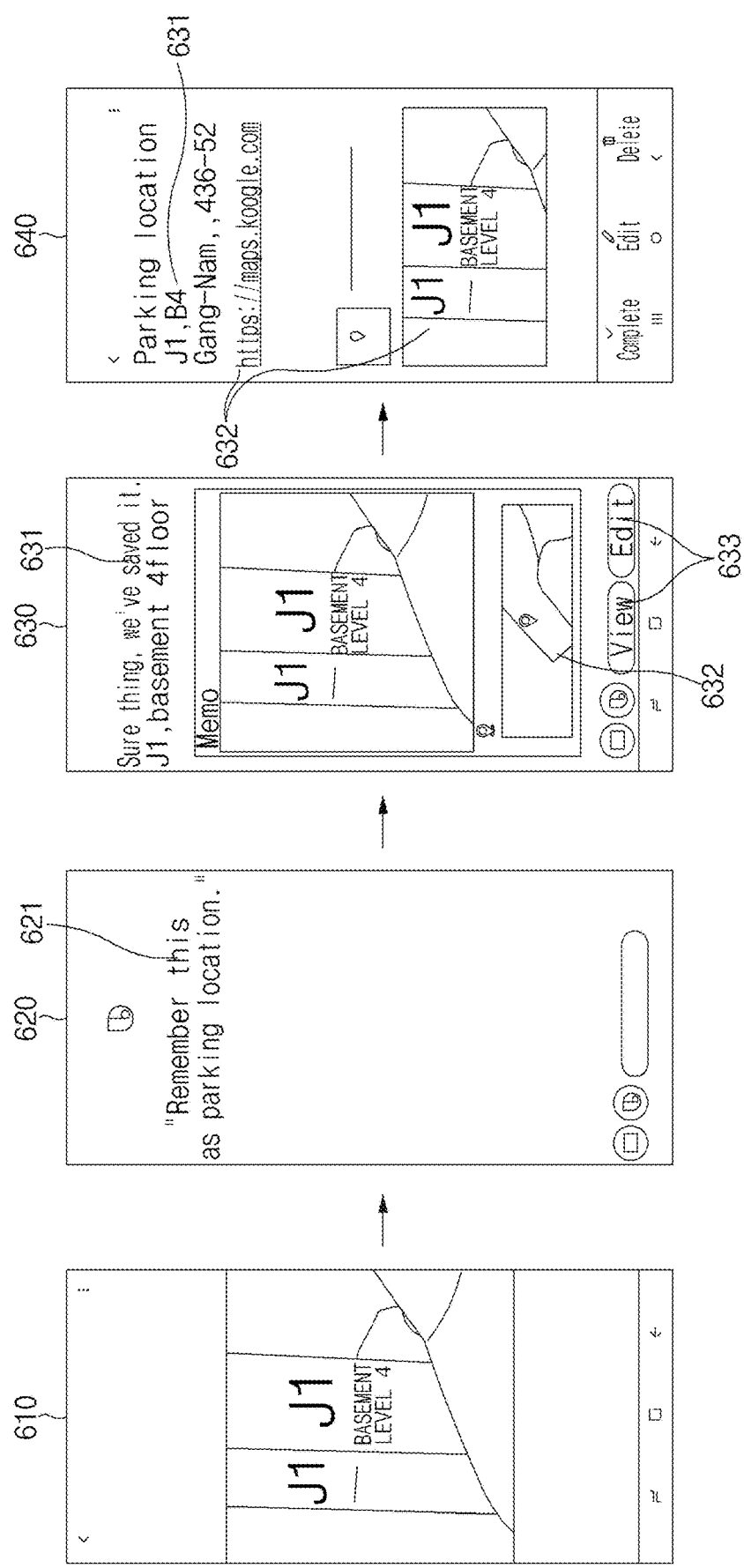
FIG. 6 illustrates a voice recognition method using a screen shot according to various embodiments of the present disclosure.

FIG. 6 illustrates a voice recognition method using screen information (e.g., image content) of an application according to various embodiments of the present disclosure. The illustration of FIG. 6 is merely an example, and embodiments of the present disclosure are not limited thereto.

Referring to FIG. 6, according to an embodiment of the present disclosure, the processor 160 may display at least one piece of image content of at least one application in a first screen 610. For example, the first screen 610 may be a screen in which one image is enlarged and displayed in a gallery application. FIG. 6 exemplarily illustrates a gallery application, but an embodiment of the present disclosure is not limited thereto. For example, the first screen 610 may be an execution screen of a message application for exchanging messages with a counterpart. For another example, the first screen 610 may be a web search screen including an image or text.

In a second screen 620, the processor 160 may execute a first application (e.g., intelligent application). The first application (e.g., intelligent application) may be executed by a startup utterance (e.g., "Wake up!" or "Hi, Bixby") or a designated user input (e.g., a touch input or hardware key input).

According to various embodiments of the present disclosure, when the first application (e.g., intelligent application) is executed, the processor 160 may automatically store image content (e.g., a screen shot or image file) of an application which has been recently being executed before execution of the first application (e.g., intelligent application). For example, in the case of a gallery application, the processor 160 may store, as an image file, image content being displayed through the gallery application. According to an embodiment of the present disclosure, the processor 160 may store, as an image file, at least a portion of a screen provided by an application being executed. According to an embodiment of the present disclosure, the processor 160 may store, as an image file, at least a portion of image information being captured by a camera application. According to an embodiment of the present disclosure, the processor 160 may store, as an image file, an image included in a web page displayed in a web browser. Stored image content may be used when the stored image content is used for processing a first utterance input 621 of the user. For example, the processor 160 may obtain, from the stored image content, data for processing the first utterance input 621, and may confirm an association relationship between the data and the first utterance input 621. The processor 160 may store associated data as first recognized data. According to an embodiment of the present disclosure, the processor 160 may provide the associated data so that the associated data may be used in a service of another application. The processor 160 may display, on the display, a result of performing a task.

The processor 160 may receive the first utterance input 621 in which a parameter for performing a task is expressed as (replaced with) a designated keyword. The parameter may be data that is determined in order to recognize an intention, act, or command of the user among input data included in the first utterance input 621. The keyword may include a demonstrative pronoun such as "this", "this place", "this person", or "this thing" or a term that does not specify a target. For example, when the first utterance input 621 reads "Store this as a parking location", the keyword may be "this", and the parameter corresponding to the keyword may be determined through image analysis.

After receiving the first utterance input 621, the processor 160 may confirm whether there is data corresponding to a format of parking information (e.g., a combination of a character and a number) in data (first recognized data) recognized by analyzing an image for the first screen 610.

In a screen 630, when the data corresponding to the format of parking information (e.g., a combination of a character and a number) is included in the image, the processor 160 may display first recognized data 631 ("J1, fourth basement level") or may store the first recognized data by mapping the first recognized data to the keyword of the first utterance input 621. Furthermore, the processor 160 may display a result of processing the first utterance input 621 using the first recognized data 631 as an essential parameter (e.g., "Yes, it was stored. Parking location: J1, fourth basement level").

According to various embodiments of the present disclosure, the processor 160 may further display additional information 632 such an image related to the first recognized data 631 and map information.

According to various embodiments of the present disclosure, the processor 160 may further display an interface 633 such as a touch button for allowing the user to confirm whether the first recognized data 631 is correct.

In a fourth screen 640, the processor 160 may store the first recognized data 631 or additional information 632 extracted through another application associated with the first recognized data 631 or the domain of the first utterance input 621. For example, when the first recognized data 631 is a parking location, the first recognized data 631 or the additional information 632 may be stored through a reminder application. According to an embodiment of the present disclosure, the additional information 632 may include location information, address information, or homepage information.

According to various embodiments of the present disclosure, the processor 160 may compile the first recognized data 631 or the additional information 632 into a database. The processor 160 may store statistics related to floors/zones in which the user frequently parks a vehicle.

FIG. 6 illustrates that the first screen 610 is executed earlier than the first application (e.g., intelligent application), but an embodiment of the present disclosure is not limited thereto. For example, the first application (e.g., intelligent application) may request a screen or image from an application which is being executed in a background or processed and performed in parallel. According to an embodiment of the present disclosure, the processor 160 may request a screen or image from an application to be executed after the first application (e.g., intelligent application) is executed. For example, when there is no application corresponding to a first utterance input among currently executed applications after the first utterance input is received, the processor 160 may further execute an application corresponding to the first utterance input, or may obtain a screen or image when an application corresponding to the first utterance input is executed after waiting for a fixed time.

Figure 7:
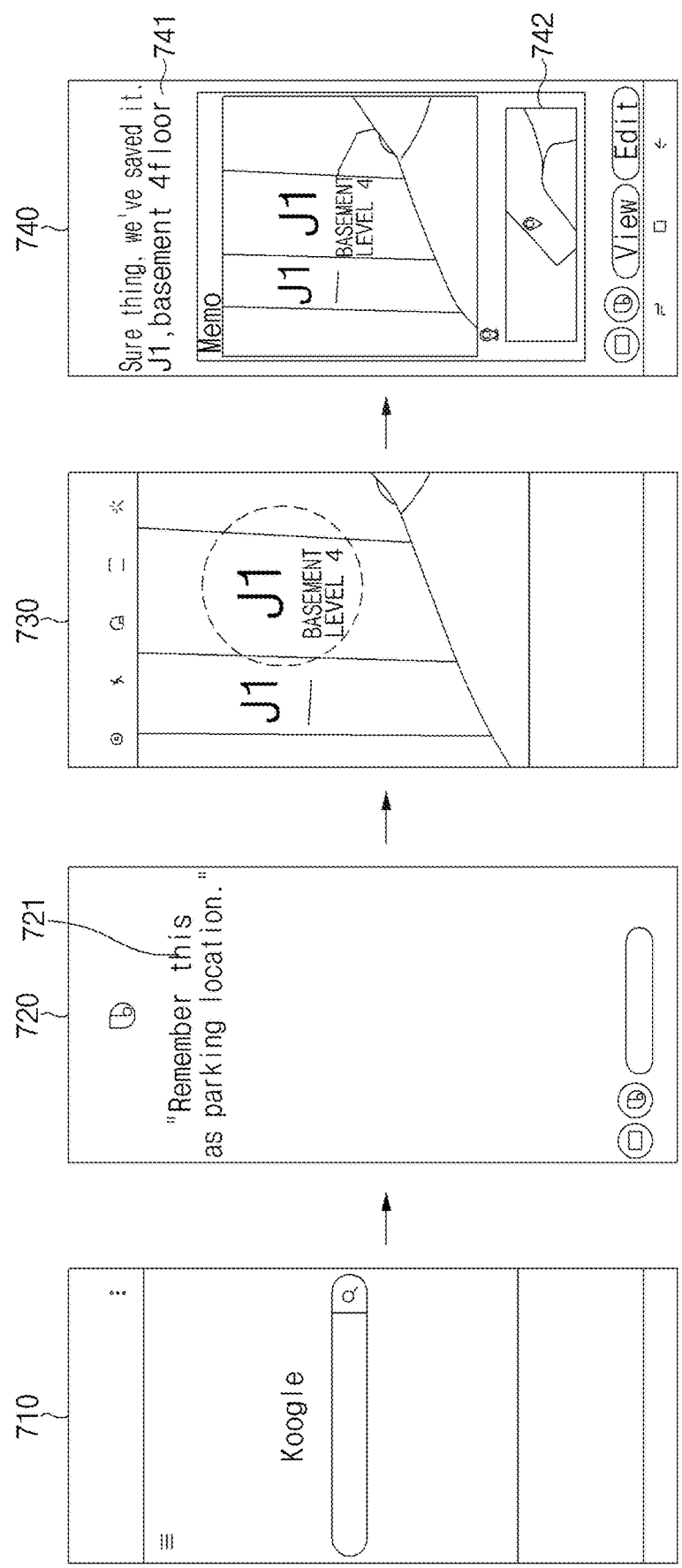
FIG. 7 illustrates a voice recognition method using a camera according to various embodiments of the present disclosure.

FIG. 7 illustrates a voice recognition method using a camera according to various embodiments of the present disclosure. The illustration of FIG. 7 is merely an example, and embodiments of the present disclosure are not limited thereto.

Referring to FIG. 7, in a first screen 710, the processor 160 may display an execution screen of at least one application. For example, the first screen 710 may be an execution screen of a web search application.

In a second screen 720, the processor 160 may execute a first application (e.g., intelligent application). The first application (e.g., intelligent application) may be executed by a startup utterance (e.g., "Wake up!" or "Hi, Bixby") of the user or a designated user input (e.g., a touch input or hardware key input).

The processor 160 may receive a first utterance input 721 of the user in a state in which the first application (e.g., intelligent application) is executed.

After receiving the first utterance input 721, the processor 160 may confirm whether there is data corresponding to the format of parking information in first recognized data extracted by analyzing an image (e.g., screen shot) for the first screen 710. The image for the first screen 710 may be stored in advance before the first application (e.g., intelligent application) is executed, or may be collected after the first utterance input 721 is received.

In a third screen 730, when there is no data corresponding to the format of parking information in the image for the first screen 710, the processor 160 may execute a camera application.

The processor 160 may confirm whether there is second recognized data corresponding to the format of parking information in an image collected through the camera application. For example, the processor 160 may confirm whether there is second recognized data corresponding to the format of parking information in data extracted from a preview image or a captured image. According to various embodiments of the present disclosure, the processor 160 may provide a guide to the user so that parking location information having a predefined format comes within an angle of view of a camera.

When recognized data corresponding to the format of parking information (e.g., a combination of a character and a number) is included in the preview image or captured image, the processor 160 may display extracted second recognized data 741 ("J1, fourth basement level") or may store the second recognized data by mapping the second recognized data to the keyword of the first utterance input 721. Furthermore, the processor 160 may display a result of processing the first utterance input 721 using the second recognized data 741 as an essential parameter (e.g., "Yes, it was stored. Parking location: J1, fourth basement level").

According to various embodiments of the present disclosure, the processor 160 may store the second recognized data 741 or additional information 742 extracted through another application associated with the second recognized data 741 or the first utterance input 721. For example, when the second recognized data 741 is a parking location, the second recognized data 741 or the additional information 742 may be stored through a reminder application. For example, when the obtained second recognized data 741 is location information, the second recognized data 741 may be provided to a map display application.

Figure 8:
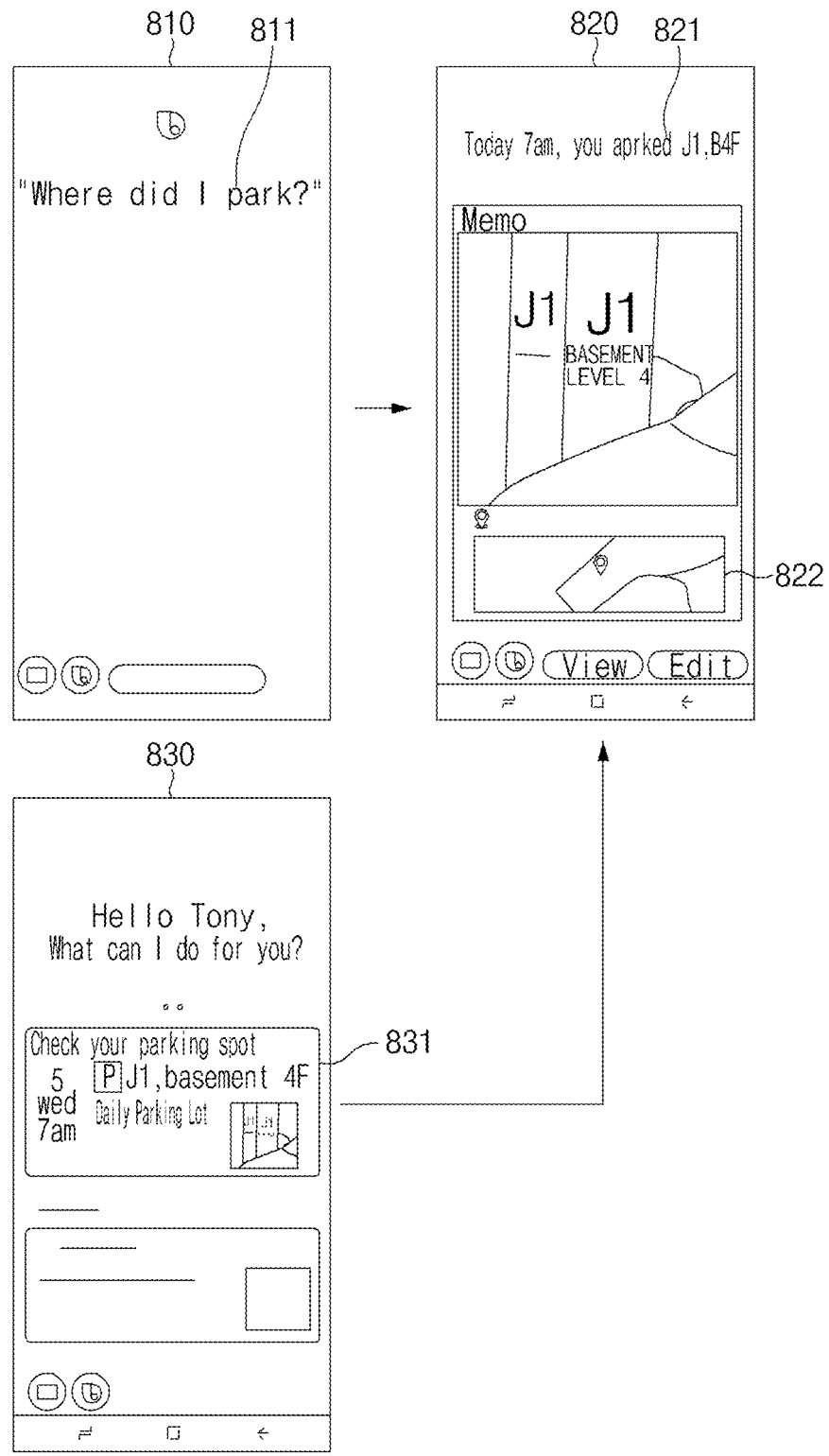
FIG. 8 illustrates a diagram of a method for using stored recognized data according to various embodiments of the present disclosure.

FIG. 8 illustrates a diagram of a method for using stored recognized data according to various embodiments of the present disclosure. The illustration of FIG. 8 is merely an example, and embodiments of the present disclosure are not limited thereto.

Referring to FIG. 8, in a first screen 810, the processor 160 may receive a second utterance input 811 in a state in which data is stored based on an image input (e.g., a screen shot or an image collected through a camera) and a first utterance input (621 of FIG. 6, 721 of FIG. 7). For example, the processor 160 may receive the second utterance input 811 of "where did I park?" in a state in which a parking location has been stored through the process illustrated in FIG. 6 or 7.

In a second screen 820, the processor 160 may display stored recognized data 821 in response to the second utterance input 811. The processor 160 may provide not only the recognized data 821 but also additional information 822 such as map information, path finding information, or time information. According to an embodiment of the present disclosure, when displaying the stored recognized data 821 in response to the second utterance input 811, the processor 160 may confirm whether the second utterance input 811 has been input due to the first utterance input (e.g., the same speaker (or user) as the first utterance input 621 of FIG. 6). For example, when it is determined that the second utterance input 811 has been uttered by the same user as the first utterance input through voice analysis, the additional information 822 may be displayed. According to an embodiment of the present disclosure, the processor 160 may perform additional authentication (e.g., biometric information, password input) after obtaining the second utterance input 811, and may provide the additional information 822.

According to various embodiments of the present disclosure, in a third screen 830, the processor 160 may display, in advance, recognized data 831 stored based on an image input (e.g., a screen shot or an image collected through a camera) and the first utterance input (621 of FIG. 6, 721 of FIG. 7) even if an additional second utterance input is not received. For example, in an execution screen of a first application (e.g., intelligent application), the recognized data 831 stored based on an image and the first utterance input may be displayed in a form of a card. The processor 160 may determine whether to display the stored recognized data 831 based on the location and commuting time of the user.

Figure 9:
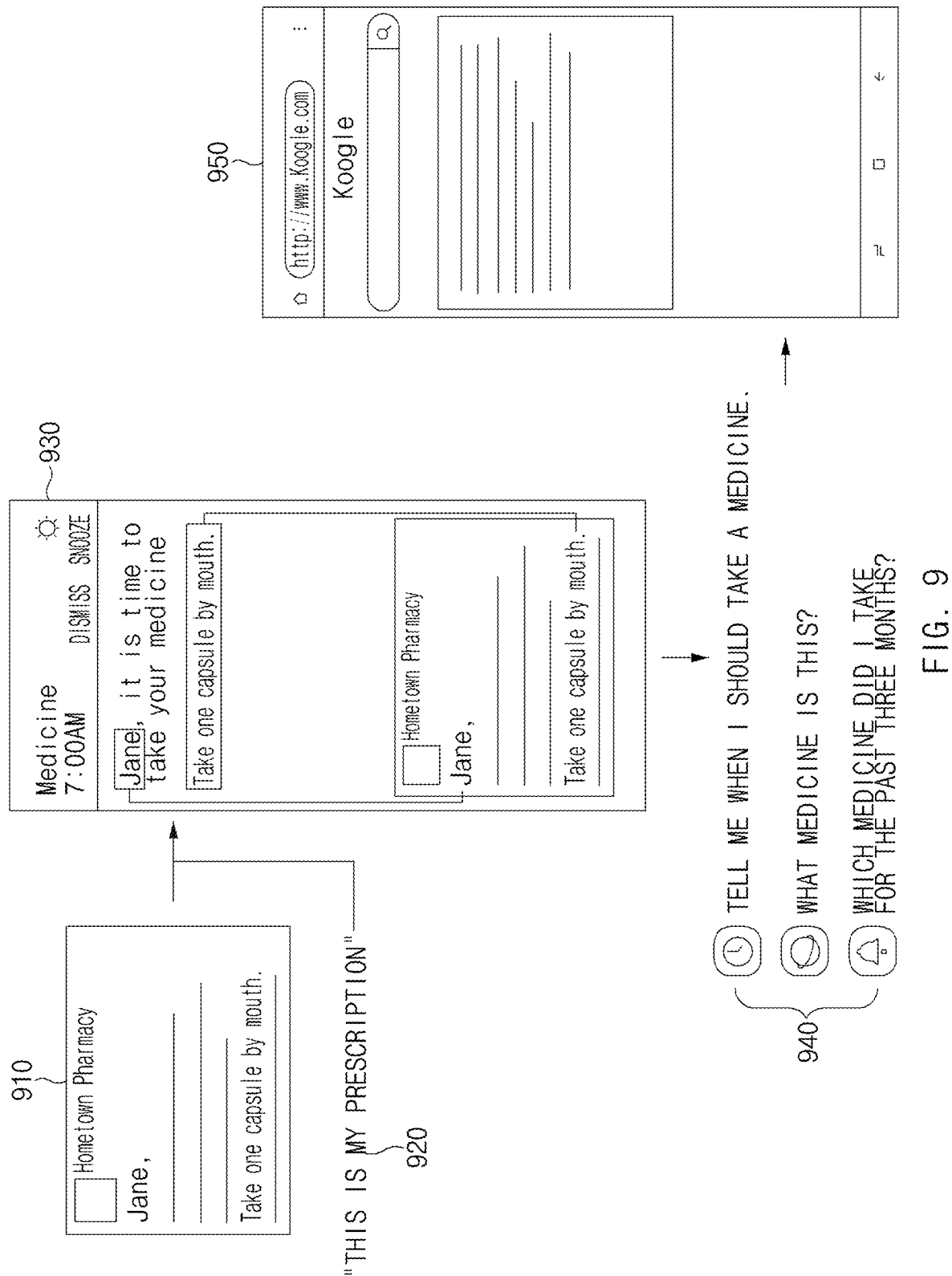
FIG. 9 illustrates a diagram of an example of information processing using an image input and a user utterance input according to various embodiments of the present disclosure.

FIG. 9 illustrates a diagram of an example of information processing using an image input and a user utterance input according to various embodiments of the present disclosure.

Referring to FIG. 9, the processor 160 may obtain recognized data using an image 910. The image 910 may be a screen shot or an image collected through a camera. The processor 160 may perform a task corresponding to a first utterance input 920 using the extracted recognized data. The processor 160 may store the extracted recognized data, or may store a result of performing the task.

For example, the image 910 may be an image of a prescription for the user, and the first utterance input 920 may read "this is my prescription".

The processor 160 may analyze the image 910 by performing an internal calculation or a calculation through an external server. For example, the processor 160 may recognize information such as "patient information (name)", "drugstore information (manufacturer number, business name, address, or phone number)", "doctor information (name, address, or phone number)", "medication ingredient information", and "medication taking period" included in the image 910. The processor 160 may store a plurality of pieces of data extracted through the image 910. The processor 160 may store the plurality of pieces of data so that the plurality of pieces of data may be processed in different applications according to attributes of the plurality of pieces of data. For example, the processor 160 may store the "doctor information" so that the "doctor information" may be processed in a contacts application, and may store the "medication taking period" so that the "medication taking period" may be processed in a schedule application.

According to various embodiments of the present disclosure, the processor 160 may store additional information related to the extracted recognized data. The additional information, which is not included in the prescription, may be information that the user may refer to, such as additional explanations about each ingredient of a medication, similar medications, precautions when taking a medicine and food that should be not taken with a medicine.

According to various embodiments of the present disclosure, the processor 160 may manage the extracted recognized data with a database. When a plurality of prescriptions are stored for the same person, the ingredients, dose amount, and taking frequency for each of the prescriptions may be recorded. The processor 160 may notify or warn the user according to a designated condition.

According to various embodiments of the present disclosure, the processor 160 may notify the user in various manners based on an attribute of each piece of the extracted recognized data. For example, in a result screen 930, the processor 160 may store the "patient information (name)" and "medication taking period" as schedule information, and may notify the user of a medication taking time when a designated time arrives.

According to various embodiments of the present disclosure, in a state in which the recognized data is stored, the processor 160 may receive a second utterance input 940 related to the recognized data or the first utterance input 920. For example, the second utterance input 940 may read "tell me when I should take a medicine", "what medicine is this?", or "which medicine did I take for the past three months?".

In the result screen 950, the processor 160 may perform a task corresponding to the second utterance input 940 using the stored recognized data. For example, when the second utterance input 940 reads "what medicine is this?", the processor 160 may display a result of searching for "medication ingredient information" from web sites.

Figure 10:
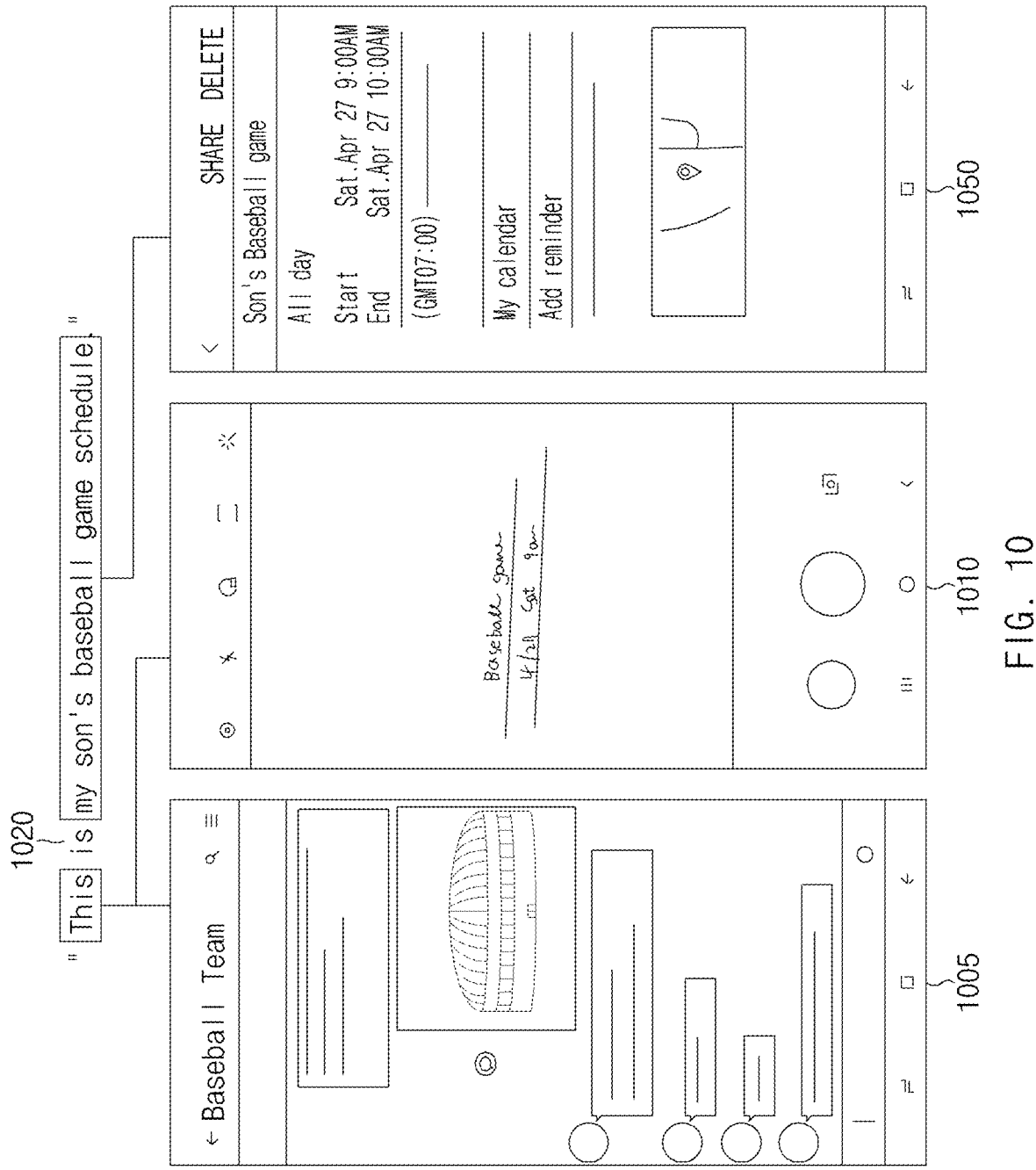
FIG. 10 illustrates a diagram of an example of a voice recognition service based on an image input through a memorandum or a message application.

FIG. 10 illustrates a diagram of an example of a voice recognition service based on an image input through a memorandum or a message application. The illustration of FIG. 10 is merely an example, and embodiments of the present disclosure are not limited thereto.

Referring to FIG. 10, recognized data may be extracted based on a screen or an image provided from an application. For example, an image 1005 provided from an application may be image information about dialogue contents on a message application. To obtain the image information displayed on the message application, the processor 160 may store, as image information, an image added on a screen being viewed by the user. According to an embodiment of the present disclosure, the processor 160 may analyze text information, and may extract the recognized data from the analyzed text information. For example, the recognized data may be extracted from text information about texts exchanged between users on the messenger application. A preview image 1010 may be an image collected in real time through a camera. The processor 160 may primarily extract recognized data related to a first utterance input 1020 through the image 1005 provided from an application, and, when there is no matching recognized data, may secondarily extract recognized data related to the first utterance input 1020 through the preview image 1010. The processor 160 may perform a task corresponding to the first utterance input 1020 using the extracted recognized data. The processor 160 may store the extracted recognized data, or may store a result of performing the task.

For example, the image 1005 provided from an application or the preview image 1010 may include information about a schedule of the user, and the first utterance input 1020 may read "this is the game schedule of my son".

The processor 160 may analyze the image 1005 provided from an application or the preview image 1010 by performing an internal calculation or a calculation through an external server. For example, the processor 160 may recognize information such as "schedule title", "date (year/month/ day)", "time (start time/end time)", "place", and "participants" included in the image 1005 provided from an application or the preview image 1010. The processor 160 may store the recognized data extracted through the image 1005 provided from an application or the preview image 1010. The processor 160 may store the recognized data in a form of a schedule application (1050).

Figure 11A:
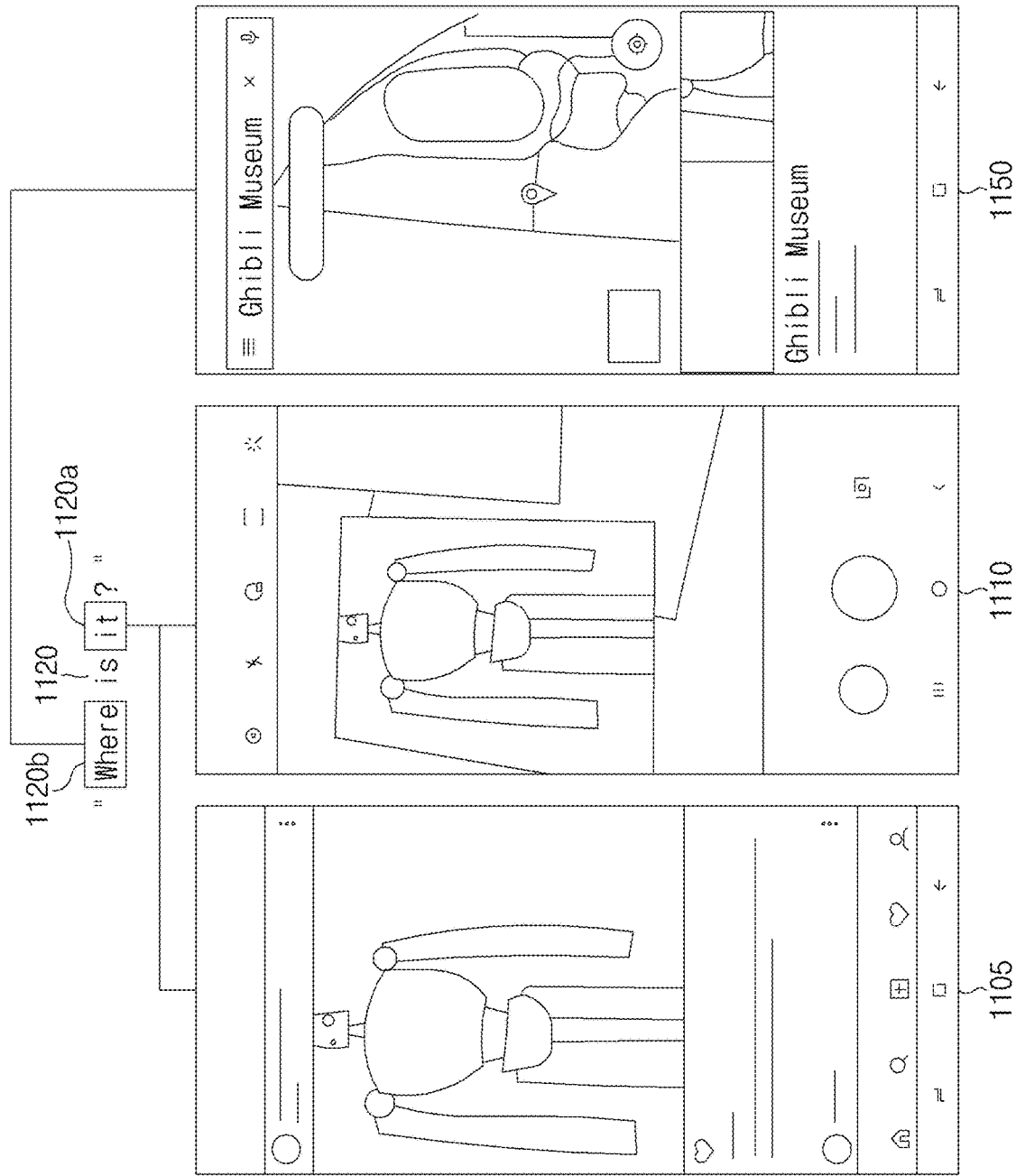
FIG. 11A illustrates a diagram of an example of a screen in which recognized data and additional information are displayed based on an image according to one occurrence of a user utterance input according to various embodiments of the present disclosure.

FIG. 11A illustrates a diagram of an example of a screen in which recognized data and additional information are displayed based on an image according to one occurrence of a user utterance input according to various embodiments of the present disclosure.

According to an embodiment of the present disclosure, the processor 160 may provide, to the user, a screen 1105 of an SNS application, or may provide an image 1110 achieved by capturing a subject in real time. Here, the processor 160 may obtain a plurality of pieces of recognized data from the screen 1105 or the image 1110. According to an embodiment of the present disclosure, the processor 160 may obtain the plurality of pieces of recognized data based on a first utterance input 1120, and may store, as recognized data, only pieces of data corresponding to the first utterance input 1120 among a plurality of pieces of previously obtained recognized data.

According to an embodiment of the present disclosure, the processor 160 may store or show data based on the first utterance input 1120. For example, when the first utterance input 1120 reads "where is it?", the processor 160 may obtain, from the screen 1105 or the image 1110, recognized data, such as "landmark name", "region name", or "object name", corresponding to a first portion 1120a "it" included in the first utterance input 1120. The recognized data "landmark name" and additional information such as location information, traffic information, and surrounding tour course information may be displayed based on a second portion 1120b "where" included in the first utterance input 1120, or may be provided so that a related application may provide a service (1150).

Figure 11B:
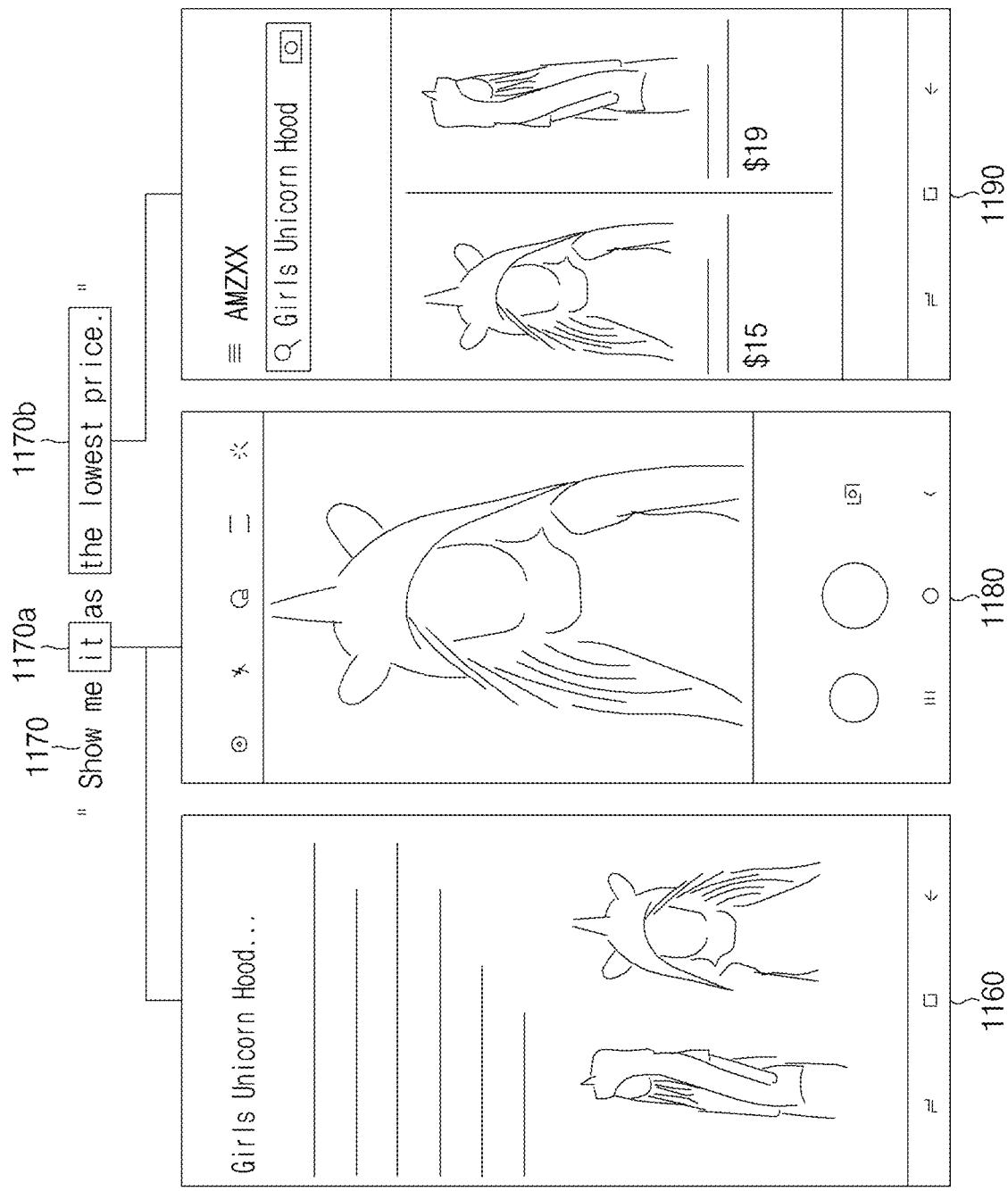
FIG. 11B illustrates a diagram of an example of a screen in which recognized data and a result achieved according to an additional condition are displayed based on an image according to one occurrence of a user utterance input according to various embodiments of the present disclosure.

FIG. 11B illustrates a diagram of an example of a screen in which recognized data and a result achieved according to an additional condition are displayed based on an image according to one occurrence of a user utterance input according to various embodiments of the present disclosure.

According to an embodiment of the present disclosure, the processor 160 may provide, to the user, a screen 1160 including item information, or may provide an image 1180 achieved by capturing a subject in real time. Here, the processor 160 may obtain a plurality of pieces of recognized data from the screen 1160 or the image 1180. According to an embodiment of the present disclosure, the processor 160 may obtain the plurality of pieces of recognized data based on a first utterance input 1170, and may store, as recognized data, only pieces of data corresponding to the first utterance input 1170 among a plurality of pieces of previously obtained recognized data.

According to an embodiment of the present disclosure, the processor 160 may store or show data based on the first utterance input 1170. For example, when the first utterance input 1170 reads "show me it as the lowest price", the processor 160 may display recognized data corresponding to a first portion 1170a of the first utterance input 1170 and additional information based on the condition "the lowest price" included in a second portion 1170b of the first utterance input 1170, or may provide the recognized data and the additional information so that a related application may provide a service (1190).

Figure 12:
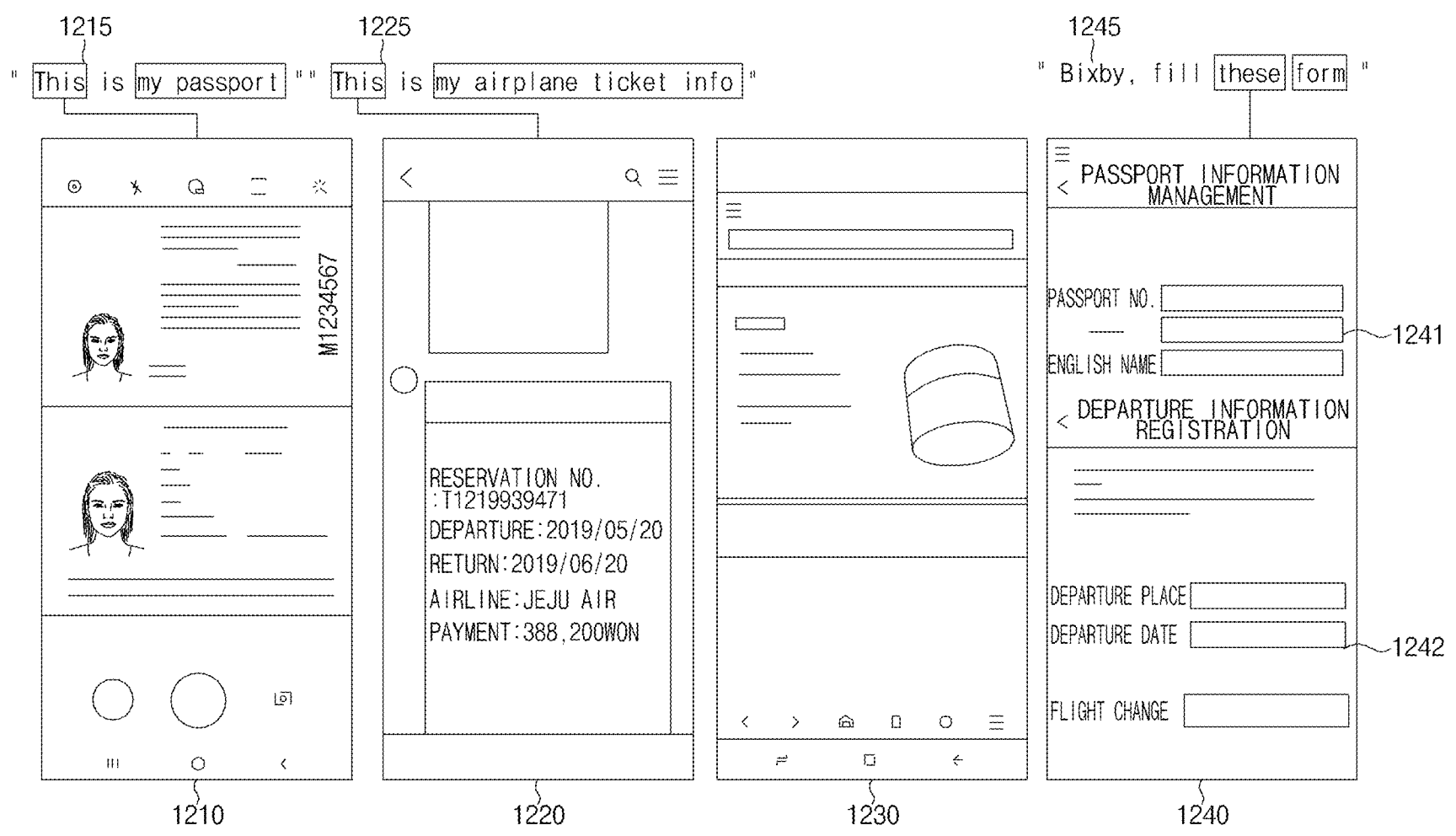

FIG. 12 illustrates a diagram of an example of a screen related to usage of recognized data stored in response to different utterance inputs according to various embodiments of the present disclosure. The illustration of FIG. 12 is merely an example, and embodiments of the present disclosure are not limited thereto.

Referring to FIG. 12, the processor 160 may store first recognized data based on a first image 1210 and a first utterance input 1215. For example, the first recognized data may be passport information.

According to various embodiments of the present disclosure, recognized data related to personal information about the user may be stored in a security folder. For example, the processor 160 may store a passport image or passport information in a security folder that may be checked through additional authentication.

The processor 160 may store second recognized data based on a second image 1220 and a second utterance input 1225. For example, the second recognized data may be flight information.

In a state in which the first recognized data and the second recognized data are stored, the processor 160 may use the first recognized data and the second recognized data in another application according to attributes of the first recognized data and the second recognized data. For example, a duty free shop application may be executed on a first screen 1230 and a second screen 1240, and a user interface including a first field 1241 for entering passport information or a second field 1242 for entering flight information may be displayed.

When a third utterance input 1245 occurs, the processor 160 may match the attribute (e.g., passport information) of the first recognized data to the attribute of the first field 1241 so as to fill the first field 1241 using the first recognized data. The processor 160 may match the attribute (e.g., flight information) of the second recognized data to the attribute of the second field 1242 so as to fill the second field 1242 using the second recognized data.

According to an embodiment of the present disclosure, when entering recognized data related to personal information about the user into the first field 1241 or the second field 1242, the processor 160 may enter the recognized data into the first field 1241 or the second field 1242 after performing an additional authentication procedure (e.g., fingerprint authentication, iris information, face authentication).

According to various embodiments of the present disclosure, an electronic device (e.g., the user terminal 100 of FIG. 1) may include a display (e.g., the display 140 of FIG. 1), a camera, a processor (the processor 160 of FIG. 1), and a memory (e.g., the memory 150 of FIG. 1) operatively connected to the processor (e.g., the processor 160 of FIG. 1), wherein the memory (e.g., the memory 150 of FIG. 1) may store instructions that cause, when executed, the processor (e.g., the processor 160 of FIG. 1) to receive a first utterance input, obtain first recognized data from a first image, store the first recognized data in association with the first utterance input when the obtained first recognized data matches the first utterance input, activate the camera when the obtained first recognized data does not match the first utterance input, obtain second recognized data from a second image collected through the camera, and store the second recognized data in association with the first utterance input when the obtained second recognized data matches the first utterance input.

According to various embodiments of the present disclosure, the instructions may cause the processor (e.g., the processor 160 of FIG. 1) to analyze the first image or the second image when the first utterance input includes a designated keyword or an essential parameter for performing a task corresponding to the first utterance input is omitted.

According to various embodiments of the present disclosure, the instructions may cause the processor (e.g., the processor 160 of FIG. 1) to execute a voice recognition application, and process the first utterance input through the voice recognition application.

According to various embodiments of the present disclosure, the instructions may cause the processor (e.g., the processor 160 of FIG. 1) to determine a format of the first recognized data or a format of the second recognized data based on an attribute of the first utterance input.

According to various embodiments of the present disclosure, the instructions may cause the processor (e.g., the processor 160 of FIG. 1) to determine a screen shot of an execution screen of a recently executed application as the first image.

According to various embodiments of the present disclosure, the instructions may cause the processor (e.g., the processor 160 of FIG. 1) to determine the first image by receiving the first image from a recently executed application.

According to various embodiments of the present disclosure, the instructions may cause the processor (e.g., the processor 160 of FIG. 1) to determine a preview screen of the camera as the second image.

According to various embodiments of the present disclosure, the instructions may cause the processor (e.g., the processor 160 of FIG. 1) to display, on the display (e.g., the display 140 of FIG. 1), a user notification or an image capture guide when the second recognized data corresponding to the attribute of the first utterance input is not recognized in the preview screen.

According to various embodiments of the present disclosure, the instructions may cause the processor (e.g., the processor 160 of FIG. 1) to determine, as the second image, an image captured in response to an image capture input from a user.

According to various embodiments of the present disclosure, the instructions may cause the processor (e.g., the processor 160 of FIG. 1) to store additional information associated with the first recognized data or the second recognized data together with the first recognized data or the second recognized data.

According to various embodiments of the present disclosure, the instructions may cause the processor (e.g., the processor 160 of FIG. 1) to store a portion of the first recognized data in association with a first application, and store another portion of the first recognized data in association with a second application.

According to various embodiments of the present disclosure, the instructions may cause the processor (e.g., the processor 160 of FIG. 1) to display the first recognized data or the second recognized data automatically or when a second utterance input is received.

According to various embodiments of the present disclosure, the instructions may cause the processor (e.g., the processor 160 of FIG. 1) to execute an application associated with a task corresponding to the first utterance input, and allow the application to enter a designated state using the first recognized data or the second recognized data.

According to various embodiments of the present disclosure, the instructions may cause the processor (e.g., the processor 160 of FIG. 1) to fill a field included in a user interface of the application using the first recognized data or the second recognized data.

An electronic device (e.g., the user terminal 100 of FIG. 1) according to various embodiments of the present disclosure may include a display (e.g., the display 140 of FIG. 1), a camera, a processor (the processor 160 of FIG. 1), and a memory (e.g., the memory 150 of FIG. 1) operatively connected to the processor (e.g., the processor 160 of FIG. 1), wherein the memory (e.g., the memory 150 of FIG. 1) may store instructions that cause, when executed, the processor (e.g., the processor 160 of FIG. 1) to execute a first application, obtain a first utterance input using the first application, obtain first recognized data associated with the first utterance input from a first image, store the first recognized data in association with the first utterance input, and provide the obtained first recognized data so that the first recognized data may be used through a second application.

According to various embodiments of the present disclosure, the instructions may cause the processor (e.g., the processor 160 of FIG. 1) to analyze the first image, execute the first application based on a result of executing the first image, and provide, to a user, a query corresponding to the result of analyzing through the first application.

According to various embodiments of the present disclosure, the instructions may cause the processor (e.g., the processor 160 of FIG. 1) to store the first recognized data in a security area of the memory (e.g., the memory 150 of FIG. 1) when the first recognized data or the first utterance input is related to personal information about a user.

A voice recognition method according to various embodiments of the present disclosure may be performed in an electronic device (e.g., the user terminal 100 of FIG. 1) and may include receiving a first utterance input, extracting first recognized data from a first image, storing the first recognized data in association with the first utterance input when the extracted first recognized data matches the first utterance input, activating a camera when the extracted first recognized data does not match the first utterance input, extracting second recognized data from a second image collected through the camera, and storing the second recognized data in association with the first utterance input when the extracted second recognized data matches the first utterance input.

According to various embodiments of the present disclosure, the extracting of the first recognized data may include determining a screen shot of an execution screen of a recently executed application as the first image.

According to various embodiments of the present disclosure, the extracting of the second recognized data may include determining a preview screen of the camera as the second image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the plurality of applications 155) including one or more instructions that are stored in a storage medium that is readable by a machine (e.g., the user terminal 100). For example, a processor (e.g., the processor 160) of the machine (e.g., the user terminal 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

An electronic device according to various embodiments of the present disclosure may provide a voice recognition service for integrally and collectively processing data analyzed through an image input and a user utterance input.

An electronic device according to various embodiments of the present disclosure may determine a target of a user utterance input by analyzing a screen shot or an image collected through a camera input, with respect to a term, the target of which is not determined, in the user utterance input.

An electronic device according to various embodiments of the present may provide, to a user, additional information related to a user utterance input and an image input.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
a microphone;
a display;
a camera;
a memory; and
a processor, wherein the processor is configured to:
  execute a first application;
  obtain a first image as a screen shot image of the first application;
  execute a voice recognition application;
  receive a first utterance input through the microphone;
  determine, using the voice recognition application, whether the first utterance input includes a parameter for performing a task;
  based on a determination that the parameter included within the first utterance input is a designated keyword, perform image analysis on the first image to obtain first recognized data associated with the first utterance input when the first utterance input includes the designated keyword, wherein the first recognized data comprises information of an object or a text included in the first image;
  determine whether the first recognized data matches the first utterance input by confirming whether an attribute of the first recognized data matches a domain of the first utterance input;
  store the first recognized data in association with the first utterance input when the first recognized data matches the first utterance input;
  activate the camera when the first recognized data does not match the first utterance input;

obtain second recognized data from a second image collected through the camera, wherein the second recognized data comprises information of an object or a text included in the second image;

analyze the second image when the parameter to perform the task corresponding to the first utterance input is omitted from the first utterance input:

determine whether the second recognized data matches the first utterance input by confirming whether an attribute of the second recognized data matches the domain of the first utterance input; and store the second recognized data in association with the first utterance input when the second recognized data matches the first utterance input.

2. The electronic device of claim 1, wherein the processor is further configured to determine a format of the first recognized data or a format of the second recognized data based on an attribute of the first utterance input.

3. The electronic device of claim 1, wherein the processor is further configured to determine the first image based on receipt of the first image from a recently executed application.

4. The electronic device of claim 1, wherein the processor is further configured to determine a preview screen of the camera as the second image.

5. The electronic device of claim 4, wherein the processor is further configured to display, on the display, a user notification or an image capture guide when the second recognized data corresponding to an attribute of the first utterance input is not recognized in the preview screen.

6. The electronic device of claim 1, wherein the processor is further configured to determine, as the second image, an image captured in response to an image capture input from a user.

7. The electronic device of claim 1, wherein the processor is further configured to store additional information associated with the first recognized data or the second recognized data togetherwith the first recognized data or the second recognized data.

8. The electronic device of claim 1, wherein the processor is further configured to:
store a portion of the first recognized data in association with a first application, and
store another portion of the first recognized data in association with a second application.

9. The electronic device of claim 1, wherein the processor is further configured to display the first recognized data or the second recognized data automatically or when a second utterance input is received.

10. The electronic device of claim 1, wherein the processor is further configured to:
execute an application associated with the task corresponding to the first utterance input, and
allow the application to enter a designated state based on the first recognized data or the second recognized data.

11. The electronic device of claim 10, wherein the processor is further configured to fill a field included in a user interface of the application based on the first recognized data or the second recognized data.

12. The electronic device of claim 1, wherein:
to perform image analysis on the first image, the processor is further configured to extract a plurality of objects from the first image; and
the processor is further configured to:
select, as the first recognized data, an object from plurality of objects, based on situation information; and
map the parameter to the selected object.

13. A voice recognition method performed in an electronic device, the voice recognition method comprising:
executing a first application;
obtaining a first image using a screen shot image of the first application;
executing a voice recognition application;
receiving a first utterance input through a microphone of the electronic device;
determining, using the voice recognition application, whether the first utterance input includes a parameter for performing a task;
based on a determination that the parameter included within the first utterance input is a designated keyword, extracting, from the first image, first recognized data associated with the first utterance input when the first utterance input includes the designated keyword, wherein the first recognized data comprises information of an object or a text included in the first image;
determining whether the first recognized data that is extracted from the first image matches the first utterance input by confirming whether an attribute of the first recognized data matches a domain of the first utterance input;
storing the first recognized data in association with the first utterance input when the first recognized data that is extracted from the first image matches the first utterance input;
activating a camera when the first recognized data that is extracted from the first image does not match the first utterance input;
extracting second recognized data from a second image collected through the camera, wherein the second recognized data comprises information of an object or a text included in the second image;
analyze the second image when the parameter to perform the task corresponding to the first utterance input is omitted from the first utterance input; and
storing the second recognized data in association with the first utterance input when the second recognized data that is extracted from the second image matches the first utterance input.

14. The voice recognition method of claim 13, wherein extracting the second recognized data comprises determining a preview screen of the camera as the second image.

* * * * *